United States Patent [19]
Kimura et al.

[11] Patent Number: 5,653,119
[45] Date of Patent: Aug. 5, 1997

[54] REFRIGERATING SYSTEM INCORPORATING THEREIN A VARIABLE CAPACITY REFRIGERANT COMPRESSOR

[75] Inventors: Kazuya Kimura; Takahiro Moroi; Shigeyuki Hidaka; Masafumi Ito; Hiroaki Kayukawa; Manabu Sugiura, all of Kariya, Japan

[73] Assignee: Kabushiki Kaisha Toyoda Jidoshokki Seisakusho, Kariya, Japan

[21] Appl. No.: 445,996

[22] Filed: May 23, 1995

[30] Foreign Application Priority Data

| May 27, 1994 | [JP] | Japan | 6-115274 |
| May 27, 1994 | [JP] | Japan | 6-115279 |
| Jun. 3, 1994 | [JP] | Japan | 6-122759 |

[51] Int. Cl.$^6$ .................................................. F25B 1/02
[52] U.S. Cl. .............................. 62/228.5; 62/197; 62/505
[58] Field of Search ........................... 62/228.1, 228.3, 62/228.5, 226, 227, 197, 505, 196.1

[56] References Cited

U.S. PATENT DOCUMENTS

| 5,076,067 | 12/1991 | Prenger et al. | 62/197 |
| 5,173,032 | 12/1992 | Taguchi et al. | 417/222.2 |
| 5,243,827 | 9/1993 | Hagita | 62/505 X |

FOREIGN PATENT DOCUMENTS

| 1019661 | 11/1957 | Germany | 62/197 |
| A337378 | 2/1991 | Japan . | |

*Primary Examiner*—Henry B. Tanner
*Attorney, Agent, or Firm*—Burgess, Ryan & Wayne

[57] ABSTRACT

A refrigerating system for air-conditioning an air-conditioned area, and incorporating therein a variable capacity refrigerant compressor in which the delivery amount of the compressed refrigerant is varied by changing the stroke of the reciprocating pistons which are operatively connected to a swash plate mechanism by changing its angle of inclination in response to a change in the pressure in a crank chamber, a condenser for condensing the compressed gas-phase refrigerant from the compressor, a pressure reducing unit for reducing the pressure of the liquid-phase refrigerant, an evaporator for vaporizing the liquid-phase refrigerant by removing heat from the air, around the evaporator, which cools the air-conditioned area, and a refrigerant supply conduit supplying the crank chamber of the compressor with a part of the liquid-phase refrigerant flowing in a portion of the refrigerant conduit extending from the condenser to the evaporator so that during the minimum capacity operation of the compressor, the compressor is cooled and lubricated by the supplied refrigerant. A flow regulating unit for adjustably regulating the flow of the liquid-phase refrigerant flowing through the refrigerant supply conduit is also arranged.

25 Claims, 16 Drawing Sheets

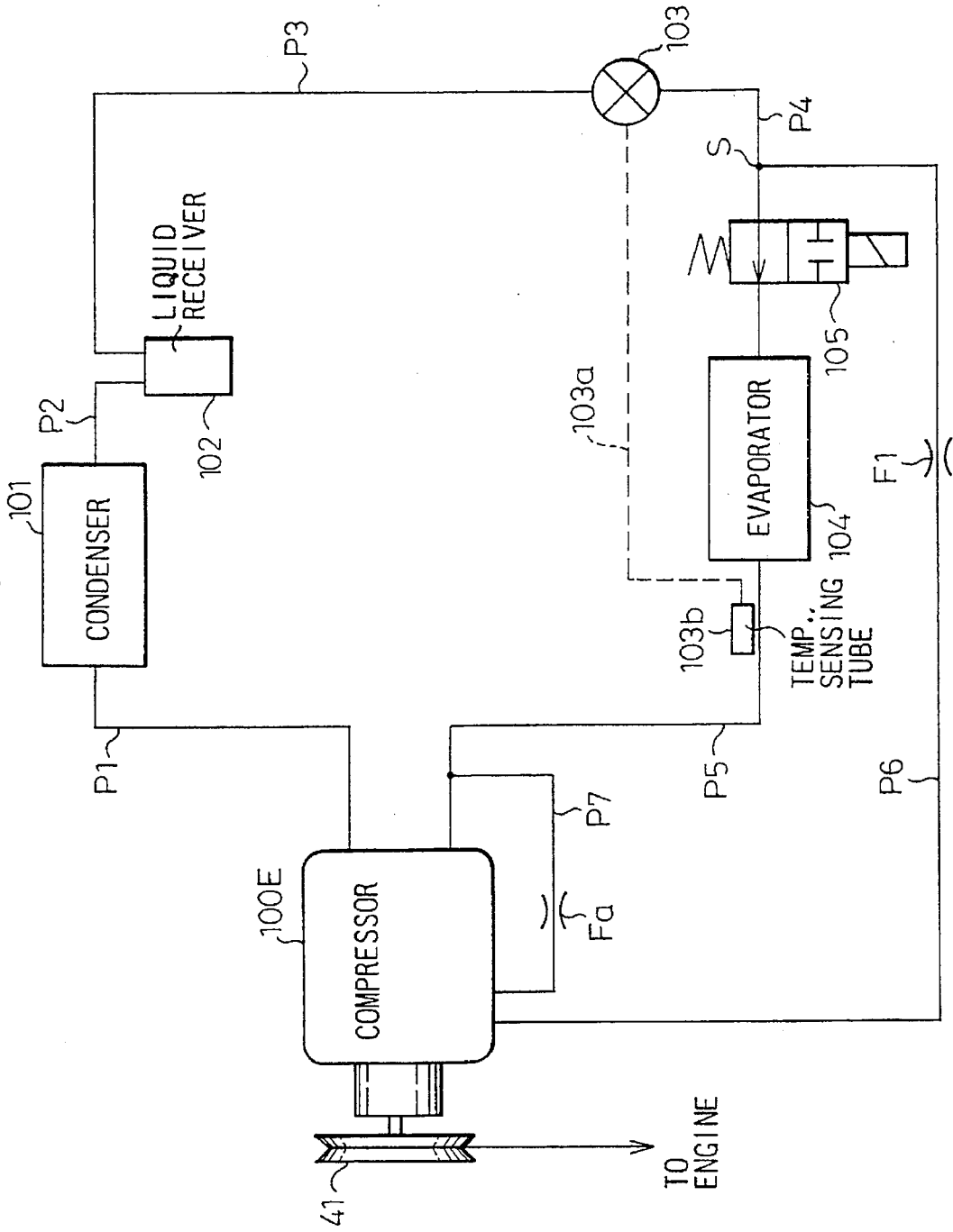

REFRIGERATING SYSTEM INCORPORATING THEREIN A VARIABLE CAPACITY REFRIGERANT COMPRESSOR

BACKGROUND OF THE INVENTION

1. Field of the Invention

The present invention relates to a refrigerating system incorporating therein a variable capacity refrigerant compressor of the type having a reciprocating piston mechanism, for compressing a refrigerant gas, and a swash plate element capable of changing its inclination angle for varying the stroke of the pistons in response to a change in the pressure prevailing in the crank chamber of the compressor. More particularly, the present invention relates to a refrigerating system incorporating a variable capacity type compressor to compress a refrigerant and air-condition an automobile compartment.

2. Description of the Related Art

A conventional refrigerating system for automobiles generally includes a refrigerant flow conduit incorporating therein a condenser, a liquid receiver, an expansion valve (pressure reducer), an evaporator, and a variable capacity compressor such as a wobble plate type variable capacity compressor, or a swash plate type variable capacity compressor.

The variable capacity compressors used in the conventional automobile refrigerating system are driven by an automobile engine via a solenoid clutch, and compress a refrigerant gas by using pistons reciprocating in the cylinder bores thereof. The compressed refrigerant gas, at a high pressure and a high temperature is delivered to the condenser of the refrigerating system wherein the gas is liquified. The refrigerant liquid is subsequently delivered from the condenser to the expansion valve wherein the refrigerant liquid is subjected to adiabatic expansion to be changed into a compound gas and liquid refrigerant at a low temperature and a low pressure. The compound refrigerant is further delivered to the evaporator wherein the compound refrigerant is evaporated by absorbing heat from the air around the evaporator to thereby cool the air which is destined to be distributed in the automobile compartment. The evaporated refrigerant in the gas phase then returns from the evaporator to the variable capacity compressor, as a low pressure refrigerant gas, via the refrigerant conduit.

The variable capacity refrigerant compressor used in the conventional refrigerating system is generally provided with a capacity control valve for controlling the amount of the compressed gas delivered by the variable capacity refrigerant compressor.

Particularly, the capacity control valve is provided to permit compressed gas at a high discharge pressure to selectively flow from the discharge chamber to the crank chamber of the compressor to thereby adjustably increase the pressure prevailing in the crank chamber in response to a change in the pressure of the refrigerant gas being sucked into the suction chamber of the compressor. When the pressure in the crank chamber is increased, the angle of inclination of the swash plate element of the compressor with respect to a plane perpendicular to the axis of the drive shaft of the compressor is reduced so as decrease the piston stroke of the pistons reciprocating in the cylinder bores and therefore, the amount of the compressed gas delivered by the compressor is reduced. It should be noted that a reduction in the delivery capacity of the compressed gas from the variable capacity compressor to the refrigerating system occurs either when the compressor is rotated at a high speed, or when the thermal load on the refrigerating system, including the compressor, is small. As a result, an amount of the refrigerant circulating through the refrigerating system is reduced, and accordingly, the refrigerant compressor must be exposed to undesirable operating conditions from the viewpoint of overheating and lack of lubrication of the compressor. Nevertheless, neither the compressor per se nor the conventional refrigerating system is provided with a means for preventing an occurrence of the above-mentioned undesirable operating conditions of the compressor.

Further, the solenoid clutch mounted on the external end of the drive shaft of the variable capacity refrigerant compressor is provided with a rotor rotatably held by the front housing of the variable capacity compressor which is driven by the automobile engine and an armature having an excitation coils arranged so as to confront the rotor. When the excitation coils are electrically energized, the armature is electro-magnetically attracted to the rotor, and accordingly, the drive power (torgue) is transmitted from the engine to the drive shaft of the compressor via the solenoid clutch. Thus, the operation of the compressor is started. However, the solenoid clutch arranged between the automobile engine and the drive shaft of the variable refrigerant compressor has various defects. Namely, since the solenoid clutch is heavy and expensive, the entire weight of the compressor with the solenoid clutch must be large and this entails an increase in the manufacturing cost of the compressor. Moreover, when the solenoid clutch is energized and de-energized, a sudden change in a load applied to the automobile engine occurs and, accordingly, can disturb the driver during the operation of the automobile. Further, it is necessary to increase the idling speed of the automobile engine in order to prevent stalling of the automobile engine due to the above-mentioned sudden change in the load applied to the automobile engine, and as a result, the fuel consumption of the automobile engine is increased. Further, the above-mentioned energizing of the excitation coils of the solenoid clutch often requires a lot of electric power, and therefore, the automobile must be equipped with an unduly large electric alternator. Thus, omission of the solenoid clutch arranged between the automobile engine and the drive shaft of the variable capacity refrigerant compressor is preferred.

In this regard, Japanese Unexamined Patent Publication No. 3-37378 discloses a non-clutch type variable capacity type compressor provided with a capacity control means for adjustably varying the amount of the compressed refrigerant gas delivered therefrom toward the refrigerating system in response to a change in the pressure of the refrigerant gas being sucked into the compressor. The compressor includes a cylinder block and a drive shaft having a pulley mounted on the external end thereof. The drive shaft is arranged so as to extend through a crank chamber formed in the cylinder block, and has a rotor element fixedly mounted thereon to rotate together with the drive shaft. A rotatable swash plate mechanism is supported by the rotor element via a hinge mechanism and by the drive shaft via a sleeve element. The swash plate mechanism is rotated within the crank chamber together with the drive shaft and can change its angle of inclination with respect to a plane perpendicular to the axis of rotation of the drive shaft. The swash plate mechanism includes nutating swash and wobble plate elements, and the wobble plate element is operatively connected to a plurality of single-headed pistons via respective piston rods. Thus, in response to the nutating motion of the wobble plate, the single-headed pistons reciprocate respectively in the corresponding cylinder bores. The compressor is further provided with a housing which defines a suction chamber for receiving a refrigerant gas, before compression, to be sucked into the respective cylinder bores, and a discharge chamber for receiving the refrigerant gas compressed in and discharged from the respective cylinder bores. The cylinder block and the housing are provided with a gas supply passageway formed therein for supplying the compressed gas from the discharge chamber to the crank chamber, and a gas extraction passageway formed therein for providing a fluid connection between the crank chamber and the suction chamber. The gas extraction passageway is provided with a choke or a throttle formed in a part thereof. The housing receives therein a capacity control valve having a pressure detecting bellows movable in response to a change in the pressure of the suction refrigerant gas and a valve element moving in response to the movement of the bellows to adjustably control the flow of the compressed refrigerant gas from the discharge chamber to the crank chamber.

The variable capacity non-clutch type compressor of Japanese Unexamined Patent Publication No. 3-37378 is characterized in that it includes a solenoid valve capable of controlling the opening area of a portion of an inlet passageway through which the suction refrigerant gas having returned from the evaporator of the refrigerating system is sucked into the suction chamber of the compressor.

The variable capacity non-clutch compressor can be driven by a drive force directly transmitting from an automobile engine via only a pulley mechanism without intervention of a solenoid clutch, and accordingly, once the automobile engine is started, the compressor immediately starts. During the running of the compressor, the capacity control valve constantly controls a pressure prevailing in the crank chamber of the compressor so as to adjustably change the angle of inclination of the swash plate mechanism to a required angle between the smallest and largest angles to thereby adjustably change a suction amount of the refrigerant gas and the delivered amount of the compressed refrigerant gas. During the running of the variable capacity non-clutch compressor, when the operation thereof to deliver the compressed refrigerant gas toward the refrigerating system is to be stopped, the above-mentioned solenoid valve is operated by an externally supplied signal so as to close the inlet passageway to thereby stop the suction of the refrigerant gas into the suction chamber. Accordingly, the pressure in the suction chamber falls and the capacity control valve reacts to the reduction in the suction pressure and immediately supplies the refrigerant gas at a high pressure from the discharge chamber to the crank chamber so as to increase the pressure prevailing in the crank chamber. As a result, the swash plate mechanism moves to the smallest angle position thereof at which the delivery capacity of the compressor becomes the minimum.

At this stage, when the delivered amount of the compressed refrigerant gas becomes a minimum, a small amount of the refrigerant gas compressed in the respective cylinder bores is discharged into the discharge chamber from the respective cylinder bores, and further flows toward the crank chamber through the gas supply passageway. Thereafter, the refrigerant gas entering the crank chamber further flows toward the suction chamber through the gas extraction passageway having the afore-mentioned choke. Nevertheless, this type of flow of the refrigerant gas circulating within the compressor from the respective cylinder bores to the suction chamber via the discharge chamber and the crank chamber is apparently different from the flow of the refrigerant passing through the refrigerating circuit. Therefore, it neither contributes to the cooling of the various moving elements of the compressor such as the swash plate, the wobble plate, shoes, and the shaft sealing devices nor achieves lubricating of the above-mentioned various moving elements if the suction of the refrigerant gas into the compressor is stopped, by the solenoid valve, at a time when the amount of lubricating oil held in the crank chamber of the compressor is reduced. Accordingly, the life of the non-clutch type refrigerant compressor is shortened.

SUMMARY OF THE INVENTION

Therefore, an object of the present invention is to eliminate the defects in a variable capacity compressor used in a conventional refrigerating system for air-conditioning an automobile compartment.

Another object of the present invention is to provide an automobile air-conditioning refrigerating system, incorporating therein a variable capacity refrigerant compressor, capable of preventing the compressor from malfunctioning when the compressor is operated at a small delivery capacity such as the minimum delivery capacity.

A further object of the present invention is to provide an automobile air-conditioning refrigerating system, incorporating therein a non-clutch type variable capacity refrigerant compressor, capable of guaranteeing a long operating life of the compressor by applying constant cooling and lubrication to the compressor even when the compressor is driven when the refrigeration of the air supplied to the compartment of the automobile is not required.

A still further object of the present invention is to provide an automobile air-conditioning refrigerating system incorporating therein a light, non-clutch type variable capacity refrigerant compressor, and capable of avoiding an uncomfortable feeling to the driver, during driving of an automobile, by omitting a solenoid clutch which is arranged between the automobile engine and the compressor and often applies a non-negligible load to the automobile engine in response to the engagement and disengagement thereof.

In accordance with the present invention, there is provided a refrigerating system for cooling the air in an air-conditioned area, which incorporates, in a refrigerant conduit means, a variable capacity refrigerant compressor including:
  a housing means for defining therein a suction chamber for a refrigerant before compression, a discharge chamber for the refrigerant after compression, and a crank chamber;
  a cylinder block having therein a plurality of cylinder bores;
  a plurality of pistons arranged to reciprocate in the plurality of cylinder bores;
  a drive shaft supported by the housing means via anti-friction bearings and rotated by a drive force transmitted from a drive source;
  a swash plate means arranged in the crank chamber so as to rotate together with the drive shaft and to change its angle of inclination with respect to a plane perpendicular to the axis of rotation of the drive shaft in response to a change in the pressure prevailing in the crank chamber to thereby adjustably change the stroke of the respective pistons; and
  a gas extraction passageway means arranged to provide a fluid communication between the crank and suction chambers;

a condenser means for condensing the compressed gas-phase refrigerant delivered by the variable capacity refrigerant compressor and delivering the refrigerant in a liquid-phase;

a pressure reducing means for reducing the pressure of the liquid-phase refrigerant;

an evaporator means for evaporating the liquid-phase refrigerant delivered by the pressure reducing means so as to remove heat from the air, around the evaporator means, which cools the air-conditioned area;

a refrigerant supply conduit means for supplying the crank chamber of the variable capacity refrigerant compressor with a part of the liquid-phase refrigerant flowing in a portion of the refrigerant conduit means extending from the condenser means to the evaporator means; and, a flow regulating means for adjustably regulating a flow of the liquid-phase refrigerant flowing through the refrigerant supply conduit means.

Preferably, the variable capacity refrigerant compressor is a non-clutch type variable capacity refrigerant compressor, the drive shaft of which is rotatively driven by a drive force transmitting from the drive source without the intervention a clutch unit therebetween. Thus, the above-mentioned pressure reducing means preferably comprises an expansion valve means for expanding the liquid-phase refrigerant so as to change it into a mist-like refrigerant. Further, the refrigerant supply conduit means preferably comprises a branch conduit means branching from a portion of the refrigerant conduit means running from the condenser means to the pressure reducing means, and extending to the crank chamber of the variable capacity refrigerant compressor, and the above-mentioned flow regulating means comprises a valve means arranged in the branch conduit means for regulating the flow of the liquid-phase refrigerant supplied from the portion of the refrigerant conduit means to the crank chamber of the variable capacity refrigerant compressor.

Preferably, the above-mentioned valve means comprises at least one two-port selector valve. The valve means may further comprise an additional two-port selector valve arranged in the refrigerant flow conduit means extending between a branching point of the branch conduit means and the pressure reducing means. The above-mentioned valve means of the flow regulating means may comprise a three-port selector valve arranged in the refrigerant flow conduit at the branching point of the branch conduit means of the refrigerant supply conduit means. The two-port and three-port selector valves may comprise solenoid operated valves.

In a refrigerating system incorporating therein a non-clutch type refrigerant compressor, the refrigerant supply conduit means preferably comprises a branch conduit means branching from a portion of the refrigerant flow conduit means running from the condenser means to the pressure reducing means, and the above-mentioned flow regulating means comprises a capacity control valve means arranged in the branch conduit means for controlling the pressure prevailing in the crank chamber of the variable capacity refrigerant compressor in response to a change in the suction pressure of the refrigerant, in a gas phase, sucked into the compressor. When the variable capacity refrigerant compressor of the refrigerating system comprises a non-clutch type refrigerant compressor, the pressure reducing means may comprise an electrically operated (electronic) expansion valve means arranged in the refrigerant flow conduit for regulating the amount of flow of the liquid-phase refrigerant flowing therethrough in response to a signal indicating the temperature of the refrigerant at a predetermined position in the refrigerant flow conduit.

In a refrigerating system employing a variable capacity type refrigerant compressor which is a clutch-mounted type refrigerant compressor driven by the drive source via a solenoid-operated clutch, the refrigerant supply conduit means may comprise a refrigerant branch conduit branching from a portion of the refrigerant flow conduit means running from the condenser means to the pressure reducing means, and extending to the crank chamber of the variable capacity type refrigerant compressor. Then, the flow regulating means comprises a capacity control valve arranged in the refrigerant branch conduit for constantly controlling the pressure in the crank chamber in response to a change in the pressure of the refrigerant sucked into the compressor.

In a refrigerating system incorporating therein a non-clutch type variable capacity refrigerant compressor, the refrigerant supply conduit means may comprise a refrigerant branch conduit means branching from a portion of the refrigerant flow conduit means running from the pressure reducing means to the evaporator means, and extending to the crank chamber of the variable capacity type refrigerant compressor. The refrigerant branch conduit is provided with a choke formed in a part thereof. Then, the flow regulating means comprises a selector valve means arranged in the refrigerant flow conduit means at a position between the branching point of the refrigerant branch conduit and the evaporator, and acting so as to selectively regulate the flow of the liquid phase refrigerant which flows in the refrigerant flow conduit means toward the evaporating means. The non-clutch type compressor preferably comprises a refrigerant supply passageway extending from the discharge chamber to the crank chamber, and a capacity control valve means arranged in the refrigerant supply passageway for controlling the pressure prevailing in the crank chamber. Then, the capacity control valve means is disposed so as to adjustably change the flow of a high pressure refrigerant, in the refrigerant supply passageway, in response to either the pressure of the refrigerant sucked into the compressor or the pressure in the refrigerant supply conduit means.

BRIEF DESCRIPTION OF THE DRAWINGS

The above and other objects, features, and advantages of the present invention will be made more apparent from the ensuing description of the preferred embodiments with reference to the accompanying drawings wherein:

FIG. 16 is a refrigerating system incorporating a variable capacity refrigerant compressor therein, according to a further embodiment of the present invention.

DESCRIPTION OF THE PREFERRED EMBODIMENTS

Figure 1:
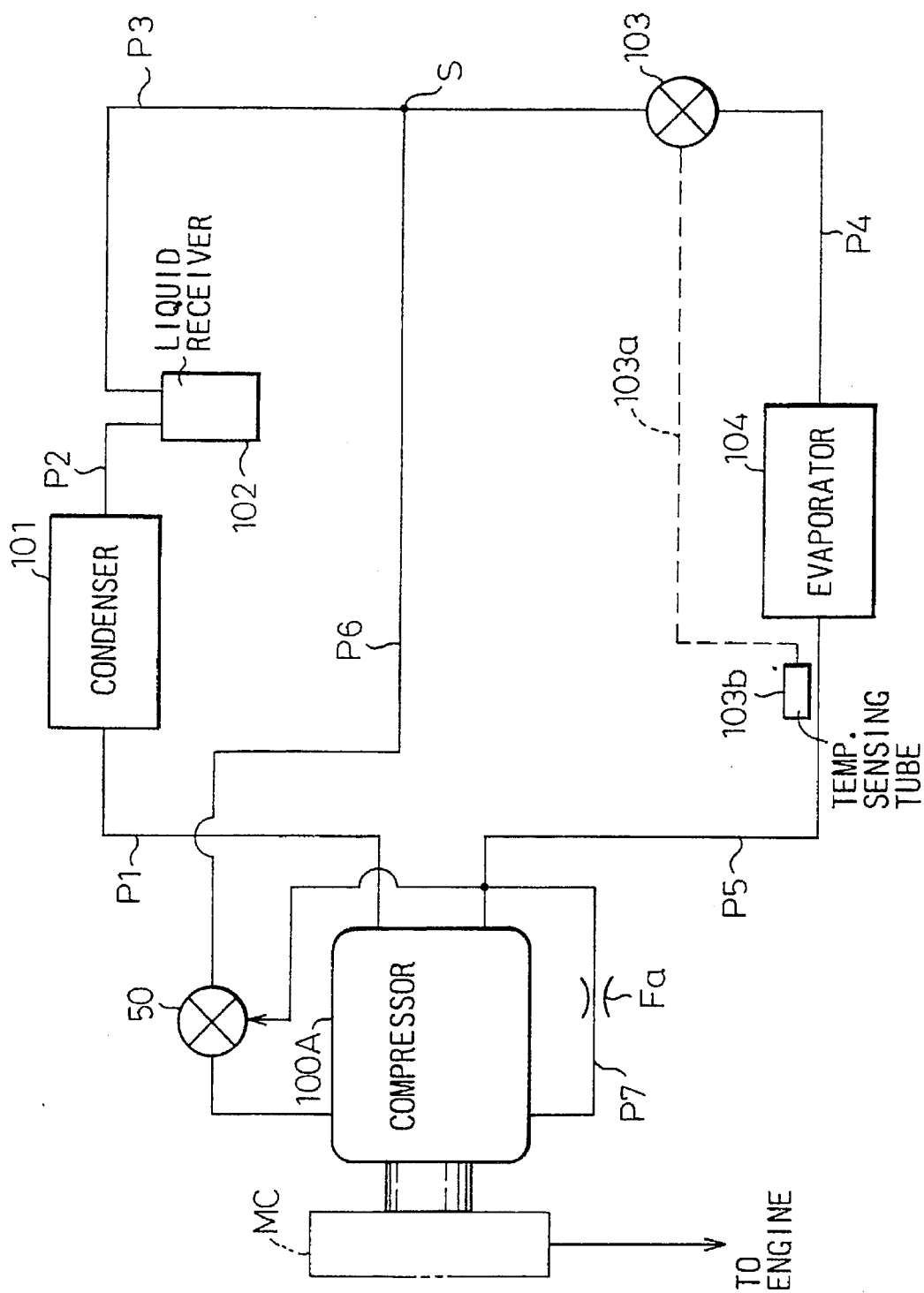
FIG. 1 is a refrigerating system incorporating a variable capacity refrigerant compressor therein, according to an embodiment of the present invention.

It should be understood that throughout the drawings illustrating various embodiments of the present invention, the same or like elements, parts and units are designated by the same reference numerals or the same reference numerals with alphabetic suffixes. Further, since all of the refrigerating circuits according to various embodiments of the present invention employ a variable capacity type compressor for compressing a refrigerant gas, it will simply be referred to as a compressor.

Referring to FIG. 1, a refrigerating system, for air-conditioning an automobile compartment, is shown. The system generally includes a compressor 100A, a condenser 101 for condensing compressed refrigerant gas, a liquid receiver 102 for receiving a condensed refrigerant, an expansion valve 103 such as a thermal type automatic expansion valve functioning as a pressure reducer, and an evaporator 104 in which the refrigerant in the liquid phase is evaporated to cool and dehumidify the air passing therearound. The above-mentioned various elements of the refrigerating system are connected by conduits P1 through P5 so that the refrigerant in the gas and liquid phases flows through these conduits. The expansion valve 103 is connected to a temperature sensing tube 103b via a capillary tube 103a, so that the decompressing function thereof is regulated by the pressure of the gas sealed in the temperature sensing tube 103b. It should be noted that, according to the embodiment of FIG. 1, a refrigerant supply conduit P6 branches at a given position from the conduit extending between the condenser 101 and the expansion valve 103, for example at an intermediate position S of the conduit P3, so as to extend to a later-described crank chamber of the compressor 100A, and has a capacity control valve 50 disposed therein.

In FIG. 1, the conduit P7, having a choke Fa and acting as a gas extraction passageway, is internally connecting between the crank chamber and a suction chamber of the compressor 100A and is illustrated as an external conduit connected to the conduit P5 for convenience. The compressor 100A is operatively connected to an automobile engine via a solenoid clutch generally designated by "MC".

Figure 2:
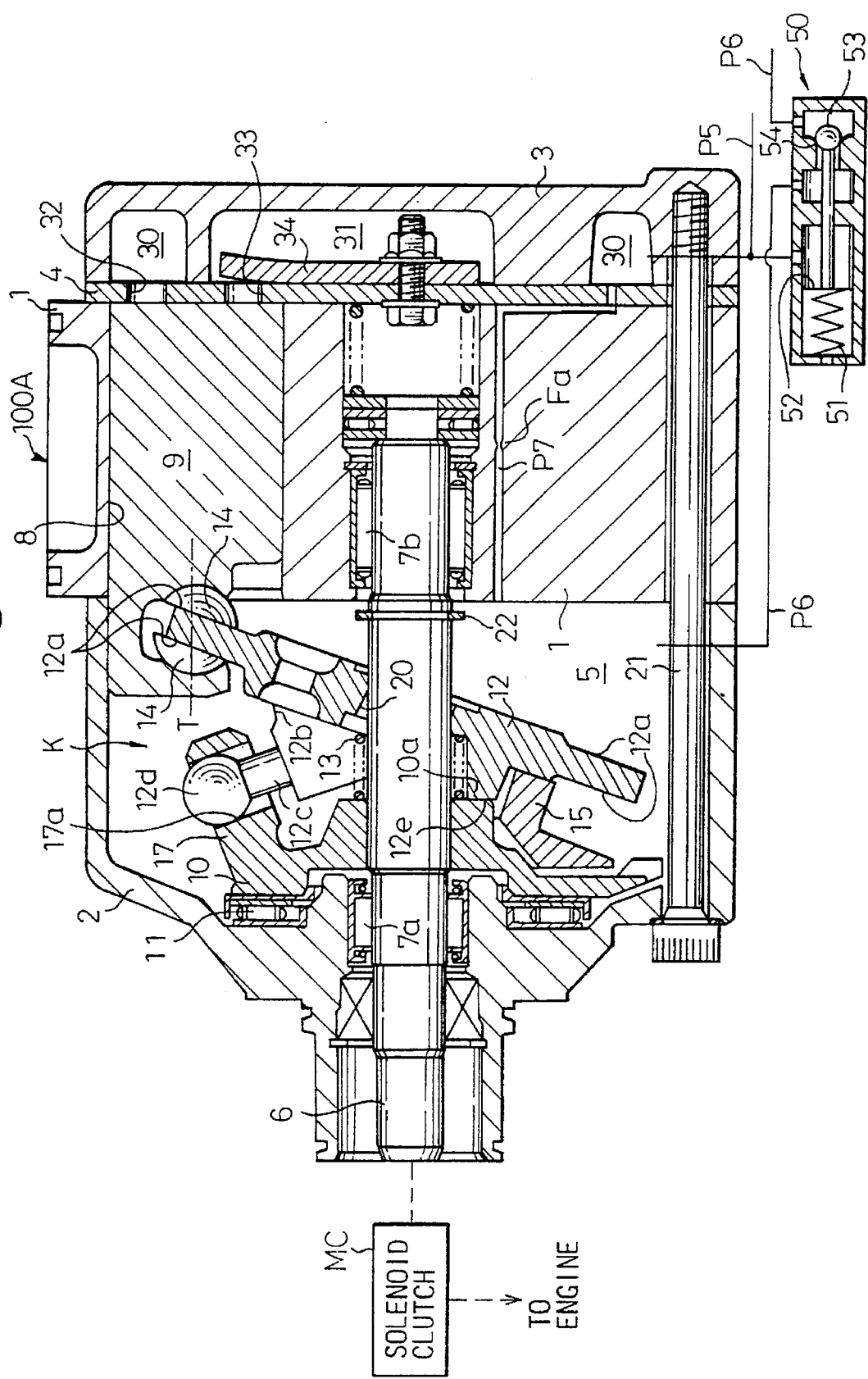
FIG. 2 is a variable capacity refrigerant compressor suitable for incorporation in the refrigerating system according to the present invention.

The compressor 100A incorporated in the refrigerating system of FIG. 1 has an internal construction thereof as shown in FIG. 2. Namely, the compressor 100A includes a cylinder block 1 having an axial front end closed by a front housing 2, and an axial rear end closed by a rear housing 3 via a valve plate 4. The front housing 2, the cylinder block 1, and the rear housing 3 are axially combined together by a plurality of long bolts 21 respectively having a screw end threadedly engaged in the threaded bore formed in the rear housing 3. The cylinder block 1 and the front housing 2 define a closed crank chamber 5 in which a drive shaft 6, supported by the front housing 2 and the cylinder block 1, axially extends. The drive shaft 6 is rotatably received by front and rear anti-friction bearings 7a and 7b which are fitted in bearing bores of the front housing 2 and the cylinder block 1, so that the drive shaft 6 has a central axis of rotation thereof. The front end of the drive shaft 6 extends beyond a shaft seal unit toward the exterior, and is connected to an automobile engine (not shown) via a solenoid clutch MC, and a power transmission mechanism (not shown).

The cylinder block 1 is provided with a plurality of axial cylinder bores 8 arranged equiangularly around the axis of rotation of the drive shaft 6, and a plurality of pistons 9 are fitted in the respective cylinder bores 8 and can reciprocate therein. A rotor 10 is mounted on the drive shaft 6, so as to rotate together with the shaft 6, and is axially supported by a thrust bearing 11 seated at an inner end of the front housing 2. A swash plate 12 is mounted around the drive shaft 6 behind the rotor 10, and is axially constantly biased rearward by a compression spring 13 arranged between the rotor 10 and the swash plate 12. The swash plate 12 has two flat annular faces 12a extending circumferentially at the periphery thereof, and the two flat annular faces 12a of the swash plate 12 are slidably engaged with flat faces of half-spherical shoes 14 which have round faces received in round recesses in the pistons 9.

The swash plate 12 is provided with a pair of brackets 12b formed in a radially inward portion of a front face of the plate 12, and the pair of brackets 12b are connected to a pair of guide pins 12c each having a ball 12d at an end thereof. The balls 12d of the guide pins 12c are movably fitted in bores 17a formed in a pair of later-described arms 17 extending from a part of the rotor 10. The above-mentioned brackets 12b, the guide pins 12c, and the balls 12d of the swash plate 12 function as a hinge mechanism K for pivotally connecting the swash plate 12 to the rotor element 10.

Further, the swash plate 12 is centrally provided with a curved through-bore 20 by which the swash plate 12 can perform a pivotal motion for changing an angle of inclination thereof with respect to a plane perpendicular to the axis of rotation of the drive shaft 6. Thus, the swash plate 12 ordinarily inclining from the above-mentioned plane is provided with a top dead center position thereof at a position designated by "T", and a bottom dead center thereof spaced 180° away from the top dead center position "T". The above-mentioned hinge mechanism K is arranged adjacent to the top dead center position "T" of the swash plate 12. The swash plate 12 is provided with a counterweight 15 rivetted to the front face of the swash plate at a position adjacent to the bottom dead center of the swash plate 12. The counterweight 18 extends radially from a central portion of the front face toward the periphery of the swash plate 12 so as to balance the weight of the hinge mechanism "K" during rotation of the swash plate 12 and the rotor 10. Furthermore, the swash plate 12 is centrally provided with a front end face 12e acting as a stop abutting against a predetermined rear face of the rotor 10 and determining the maximum angle of inclination of the swash plate 12.

The minimum angle of inclination of the swash plate 12 is determined when a central recess formed in the rear face of the swash plate 12 comes into engagement with a circlip 22 mounted on a predetermined position of the drive shaft 6.

The rotor 10 is provided with the above-mentioned pair of arms 17 extending rearward from a portion of the rotor 10 toward the afore-mentioned guide pins 12c of the swash plate 12. The pair of arms 17 are formed with a pair of guide through-bores 17a in which the balls 12d of the hinge mechanism K is smoothly fitted, so that the swash plate 12 hinged to the rotor 10 is permitted to stably pivot about the center of the balls 12d of the hinge mechanism K when the swash plate 12 changes its angle of inclination. The hinge mechanism K and the guide through-bores 17a are provided and set so that the top dead center of respective pistons 9 is unchanged even if the swash plate 12 changes its angle of inclination.

The rear housing 3 of the compressor 100A is provided with an annular suction chamber 30 for receiving a refrigerant gas before compression, and a central discharge chamber 31 for the refrigerant gas after compression. The valve plate 4 is provided with a plurality of suction ports 32 providing a communication between the respective cylinder bores 8 and the suction chamber 30, and a plurality of discharge ports 33 providing a communication between the respective cylinder bores 8 and the discharge chamber 31.

The suction ports 32 of the valve plate 4 are closed by suction valves (not shown) which can be moved to the opening position thereof when the respective pistons 9 carry out the suction stroke, and the discharge ports 33 of the valve plate 4 closed by discharge valves (not shown) which can be moved to the opening position thereof when the respective pistons 9 carry out the discharge stroke. The opening position of each of the discharge valves is defined by valve retainers 34 arranged in the discharge chamber 31. A passageway designated by P7 corresponds to the conduit P7 of FIG. 1, and functions as a gas extraction passageway disposed between the crank chamber 5 and the suction chamber 30 of the rear housing 3 for extracting a part of the refrigerant gas from the crank chamber 5 to the suction chamber 31 as required, via a choke provided in a middle position of the passageway P7. At least an end of the passageway P7 opens toward the crank chamber 5 at a position adjacent to the drive shaft 6 so as to extract only the refrigerant in a gas phase from the crank chamber 5 toward the suction chamber 30. Namely, any refrigerant in the liquid phase remaining in the bottom portion of the crank chamber 5 can be prevented from flowing from the crank chamber 5 toward the suction chamber 30 by the arrangement of the opening end of the gas extraction passageway P7 adjacent to the drive shaft 6 when the compressor 100A is mounted in an engine compartment of an automobile at a horizontal posture thereof, as shown in FIG. 2.

A capacity control valve 50 is arranged in the afore-mentioned conduit P6 so as to regulate the amount of the refrigerant supplied to the crank chamber 5 from the branching point S of FIG. 1, in response to a change in the pressure of the refrigerant gas flowing in the conduit P5 or in the suction chamber 30.

As schematically shown in FIG. 2, the capacity control valve 50 is provided with a cylindrical housing in which a compression spring 51 is disposed so as to constantly press a diaphragm 52 to which a valve rod having a ball type valve element 53 is connected. The ball type valve element 53 is seated on a valve seat 54 formed in an end of a valve port disposed in the conduit P6, and is moved toward and away from the valve seat 54 to thereby open and close the valve port in the conduit P6. The diaphragm 52 receiving a spring force of the compression spring 51 is moved by detecting a change in a pressure coming from the conduit P5, and moves the ball type valve element 53 with respect to the valve seat 54 to thereby open or close the valve port in the conduit P6.

The capacity control valve 50 sensing the pressure in the conduit P5 may be arranged so as to detect a pressure either at an inlet of the evaporator 104 or inside the evaporator 104. Further, the capacity control valve 50 may be disposed at either a position adjacent to the compressor 100a in the engine compartment or a clean position adjacent to the evaporator 104 which is ordinarily arranged in an automobile compartment for a driver and other persons.

When the solenoid clutch MC (FIGS. 1 and 2) is energized to connect the drive shaft 6 of the compressor 100A to the automobile engine, the drive shaft 6 is rotated to start the compressing operation of the compressor 100A, and accordingly, the refrigerating system of FIG. 1 begins to operate. The refrigerating operation of the refrigerating system of FIG. 1 will be described below.

When the compressor 100A is driven, the respective pistons 9 reciprocate in the corresponding cylinder bores 8, and accordingly, the refrigerant in the gas phase coming from the evaporator 104 via the conduit P5 and the suction chamber 30 is sucked into the respective cylinder bores 8 to be compressed therein. The compressed refrigerant gas is discharged from the respective cylinder bores 8 toward the discharge chamber 31. The compressed refrigerant gas at a high pressure and a high temperature is delivered from the discharge chamber 31 of the compressor 100A toward the condenser 101 in which the compressed refrigerant gas is condensed to become the refrigerant in the liquid phase. The liquified refrigerant goes through the conduit P2, the liquid receiver 102, the conduit P3, and to the expansion valve 103 where the refrigerant in the liquid phase is adiabatically expanded to become a mist of the refrigerant. Since the expansion valve 103 which is regulated by the temperature sensing tube 103b via the capillary tube 103a permits only a regulated amount of the refrigerant mist to flow therethrough toward the evaporator 104 via the conduit P4. The refrigerant gas is then evaporated in the evaporator by removing heat from the air around the evaporator 104 to become the refrigerant in the gas phase, and cools the air. The cooled air is supplied to the automobile compartment, and contributes to a reduction in the temperature within the automobile compartment.

The evaporated refrigerant gas flows from the evaporator 104 toward the compressor 100A via the conduit P5, and is sucked into the suction chamber 30 of the compressor 100A.

During the operation of the compressor 100A, when the thermal load applied to the refrigerating system and the compressor 100A is reduced or when the rotating speed of the drive shaft 6 of the compressor increases, the pressure of the suction refrigerant gas (the suction pressure) is reduced. At this stage, if the suction pressure in the conduit P5 and the suction chamber 30 is reduced to a pressure level lower than a preset value, the capacity control valve 50 immediately responds to the pressure reduction, and moves the ball type valve element 53 away from the valve seat 54 to open the valve port in the conduit P6. Thus, the liquid phase refrigerant at a high pressure in the conduit P3 flows from the branch point S to the crank chamber 5 in the compressor via the conduit P6 and the capacity control valve 50. Thus, the liquid phase refrigerant entering the crank chamber 5 causes an increase in the pressure prevailing in the crank chamber 5, and accordingly, the swash plate 12 is moved to a position wherein the angle of inclination of the swash plate 12 is sufficiently small to thereby sufficiently reduce the delivery capacity of the compressor 100A.

It should be understood that the liquid phase refrigerant condensed by the condenser 101 and supplied from the conduit P3 to the crank chamber 5 is subjected to a pressure reduction when it passes through the capacity control valve 50 before entering the crank chamber 5, and that the liquid phase refrigerant entering the crank chamber 5 is permitted to vaporize therein. Therefore, the compressor 100A per se is cooled by the refrigerant during the vaporization of the refrigerant. Further, lubricant oil particles or droplets contained in the liquid phase refrigerant entering the crank chamber 5 are left and reserved in the crank chamber without being carried away by the vaporized refrigerant. Therefore, the lubricating oil lubricates the moving elements of the compressor 100A, and constantly maintains the interior of the compressor 100A in a lubricated condition irrespective of the operating condition of the compressor 100A. Namely, the compressor 100A can be prevented from malfunctioning even when the compressor is operated at a small delivery capacity.

Figure 3:
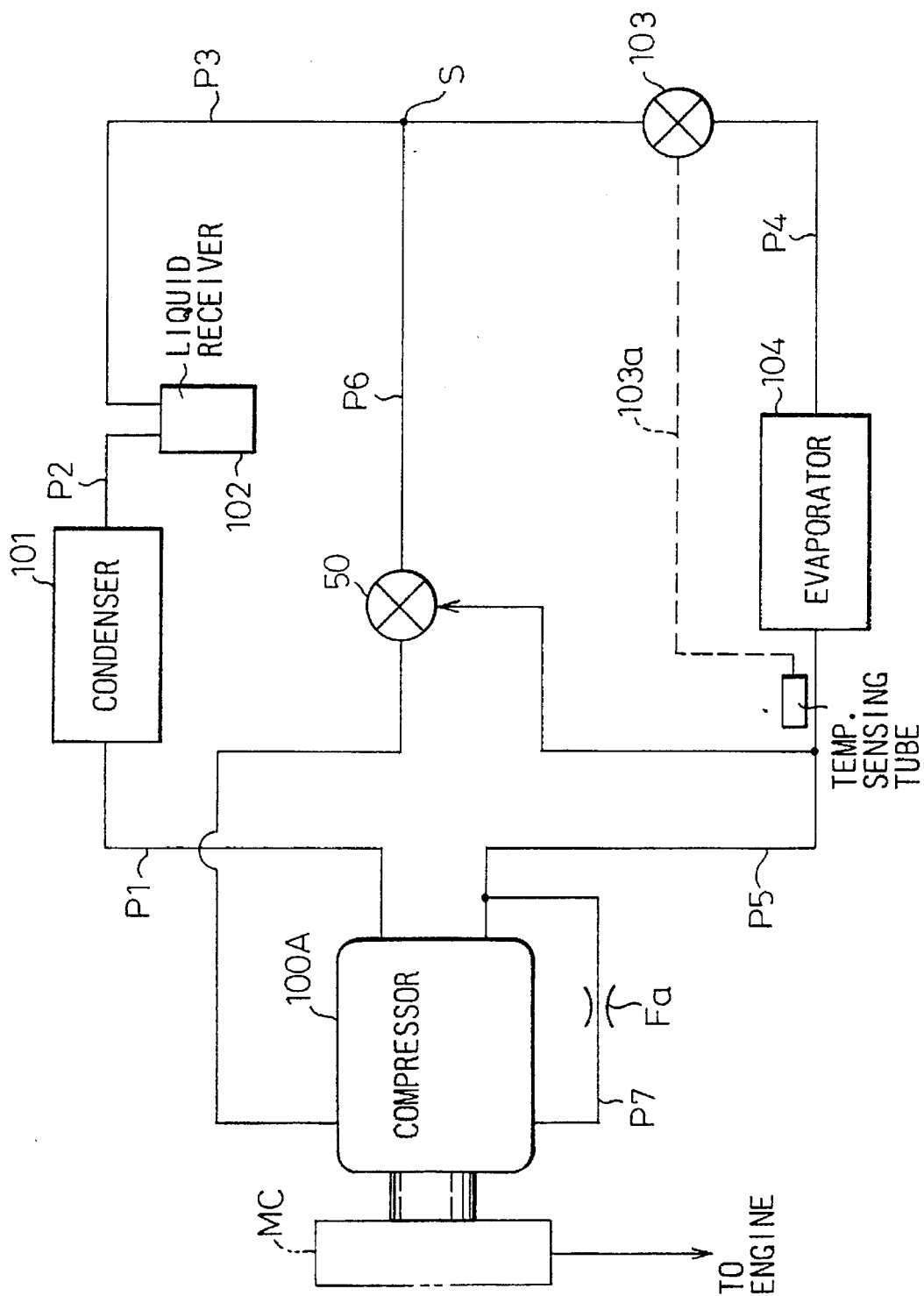
FIG. 3 is a refrigerating system incorporating a variable capacity refrigerant compressor therein, according to another embodiment of the present invention.

FIG. 3 illustrates a refrigerating system which is different from that of FIG. 1 in that the capacity control valve 50 is directly regulated by the pressure of the refrigerant gas at a position adjacent to the outlet of the evaporator 104. Therefore, the capacity control valve 50 can operate without being adversely affected by a pressure loss occurring in the suction system conduit P5, and accordingly, the operation of the capacity control valve 50 can be more accurate than in the case of the refrigerating system of FIG. 1. As a result, a precise control of the temperature of evaporator 104 can be achieved.

Figure 4:
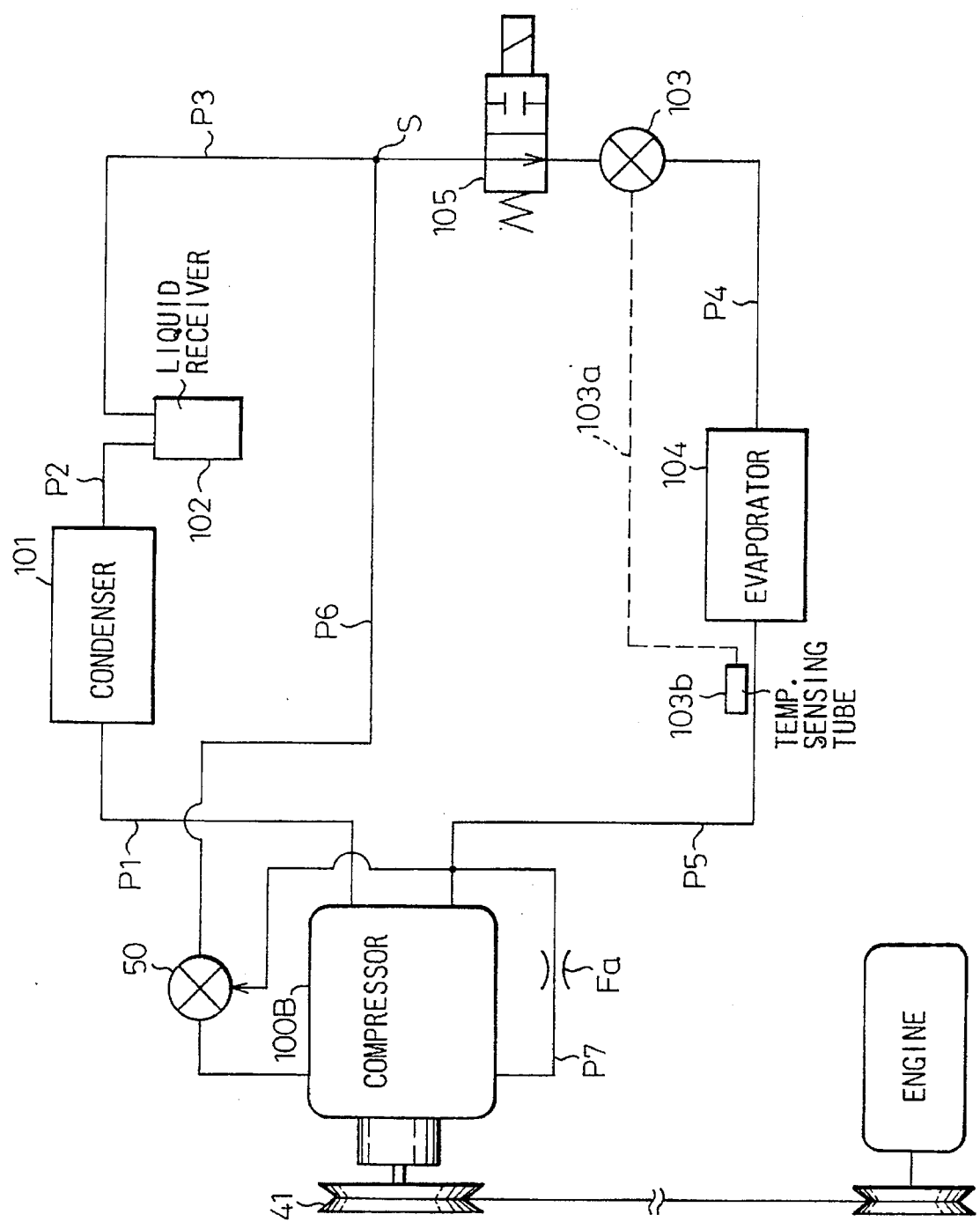
FIG. 4 is a refrigerating system incorporating a variable capacity refrigerant compressor therein, according to a further embodiment of the present invention.
Figure 5:
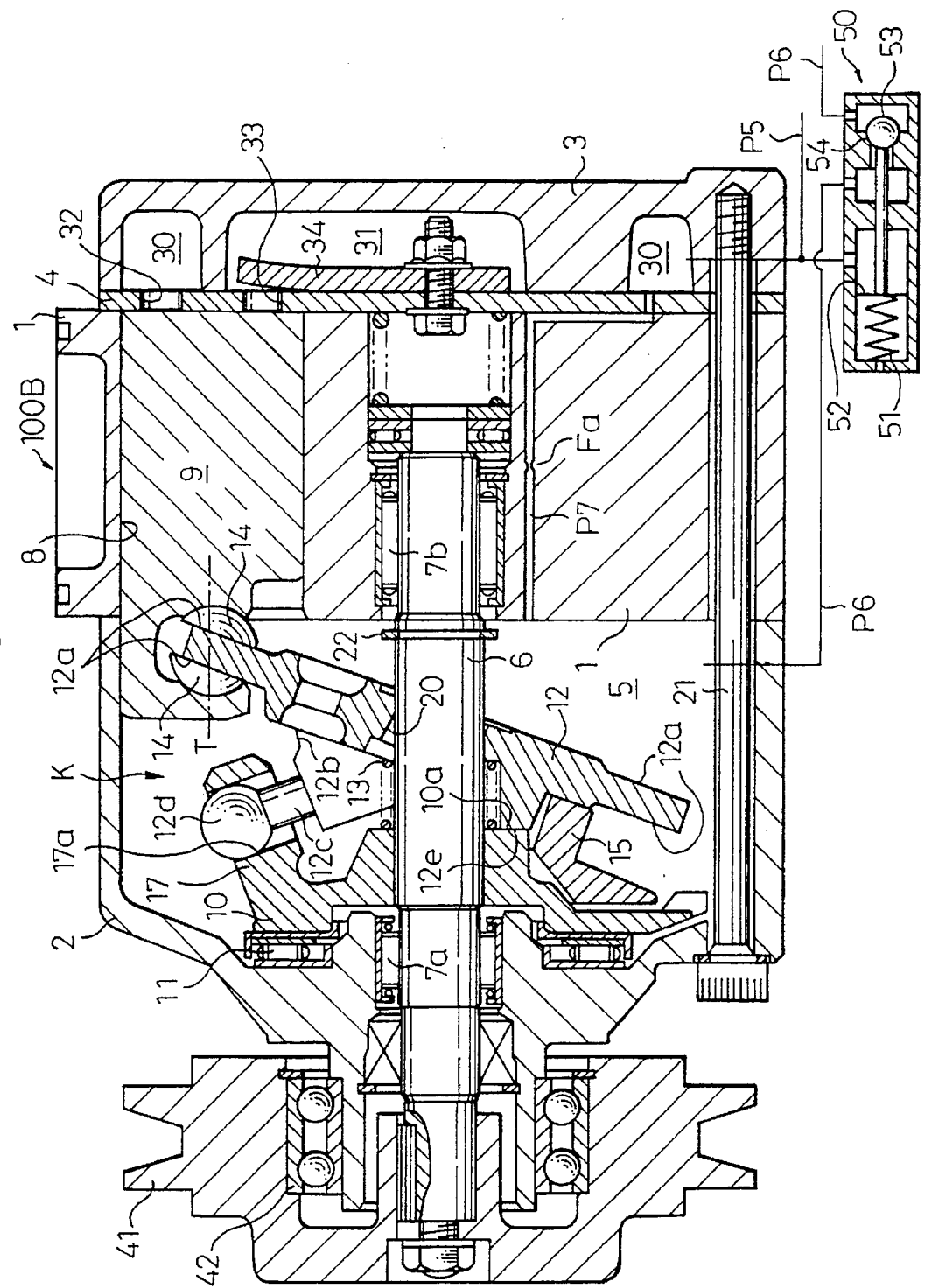
FIG. 5 is a variable capacity refrigerant compressor suitable for incorporation in the refrigerating system of FIG. 4.

FIGS. 4 and 5 illustrate a different embodiment of the refrigerating system for an automobile compartment. In the refrigerating system of FIG. 4, a non-clutch compressor 100B as shown in FIG. 5 is used to compress the refrigerant gas. Namely, as is apparent from FIG. 5, the compressor 100B is different from the afore-mentioned compressor 100A in that the compressor 100B is directly connected to an automobile engine via a pulley 41 fixedly mounted on a drive shaft 6 and a belt without intervention of the clutch device MC. The pulley 41 is supported by an end of the front housing 2 via a radial type anti-friction bearing 42. It should be understood that the other construction of the compressor 100B is the same as that of the compressor 100A.

Referring to FIG. 4, the refrigerating system of the present embodiment is different from that of the previous embodiment of FIGS. 1 and 3 in that a solenoid-operated valve 105 (the two port normally open valve) is arranged in the conduit P3 extending from the liquid receiver 102 and the expansion valve 103 at a position between the branching point S and the inlet of the expansion valve 103. The solenoid-operated valve 105 functions to selectively open and close a portion of the conduit P3 in response to a command signal supplied from e.g., the control panel of the automobile.

The compressor 100B of the refrigerating system of FIG. 4 is operated by a drive force from the automobile engine as soon as the automobile engine is started. When the solenoid-operated valve 105 is positioned at an open position as shown in FIG. 4, the refrigerating system carries out an refrigerating operation to cool the air supplied to an automobile compartment.

During the refrigerating operation of the refrigerating circuit, if cooling of the air should be stopped, the solenoid-operated valve 105 is shifted, by a command signal supplied from e.g., the control panel of the automobile, to a closed position where the flow of the refrigerant in the conduit P3 is stopped. Thus, the suction pressure in the refrigerant suction system, i.e., in the conduits P4 and P5, is reduced. Therefore, the valve port of the capacity control valve 50 is opened, at the valve seat 54, by the movement of the valve element 53 away from the valve seat 54. Accordingly, all the refrigerant in the liquid phase flowing in the conduit P3 is supplied from the branching point S to the crank chamber 5 of the compressor 100B. The refrigerant supplied to the crank chamber 5 of the compressor 100B quickly increases the pressure prevailing in the crank chamber 5. Thus, the swash plate 12 of the compressor 100B is moved to a position where the angle of inclination of the swash plate 12 is small, and the delivery capacity of the compressor 100B is in turn reduced to the minimum. However, a small amount of the compressed refrigerant in the gas phase is delivered from the discharge chamber 31 of the compressor 100B, and circulates through the condenser 101, the liquid receiver 102, the conduits P3 and P6, the capacity control valve 50, the crank chamber 5, the gas extraction passageway P7, the suction chamber 30, the cylinder bores 8, and the discharge chamber 31.

Since the above-mentioned refrigerant circulating through the diverse elements in the refrigerating system is cooled and liquified by the condenser 101, and is subjected to a pressure reduction due to a choking action by the capacity control valve 50 before entering the crank chamber 5 of the compressor 100B, when the refrigerant enters the crank chamber 5, it is vaporized by removing heat from the body of the compressor 100B. Also, the lubricating oil is constantly retained in the crank chamber 5. Therefore, although the cooling of the air is stopped due to the closing of the solenoid-operated valve 105, the cooling and lubrication of the non-clutch compressor 100B can be constantly and successfully carried out during the continuous operation of the compressor 100B.

From the foregoing, it will be understood that when the cooling of the air by the refrigerating system is stopped, only a small amount of the refrigerant is sucked, compressed and delivered by the non-clutch compressor 100B, and accordingly, only a very small load, in addition to a frictional loss occurring in the rotating elements of the compressor 100B, is applied to the automobile engine. Thus, the automobile engine is not adversely affected by the continuous operation of the compressor 100B.

Further, since the gas extraction passageway P7 formed in the compressor 100B is provided with an end opening toward the crank chamber 5 at a position adjacent to the drive shaft 6, the extraction of the gas phase refrigerant from the crank chamber 5 is successfully achieved and extraction of the liquid phase refrigerant from the crank chamber 5 toward the suction chamber 30 can be prevented.

Figure 6:
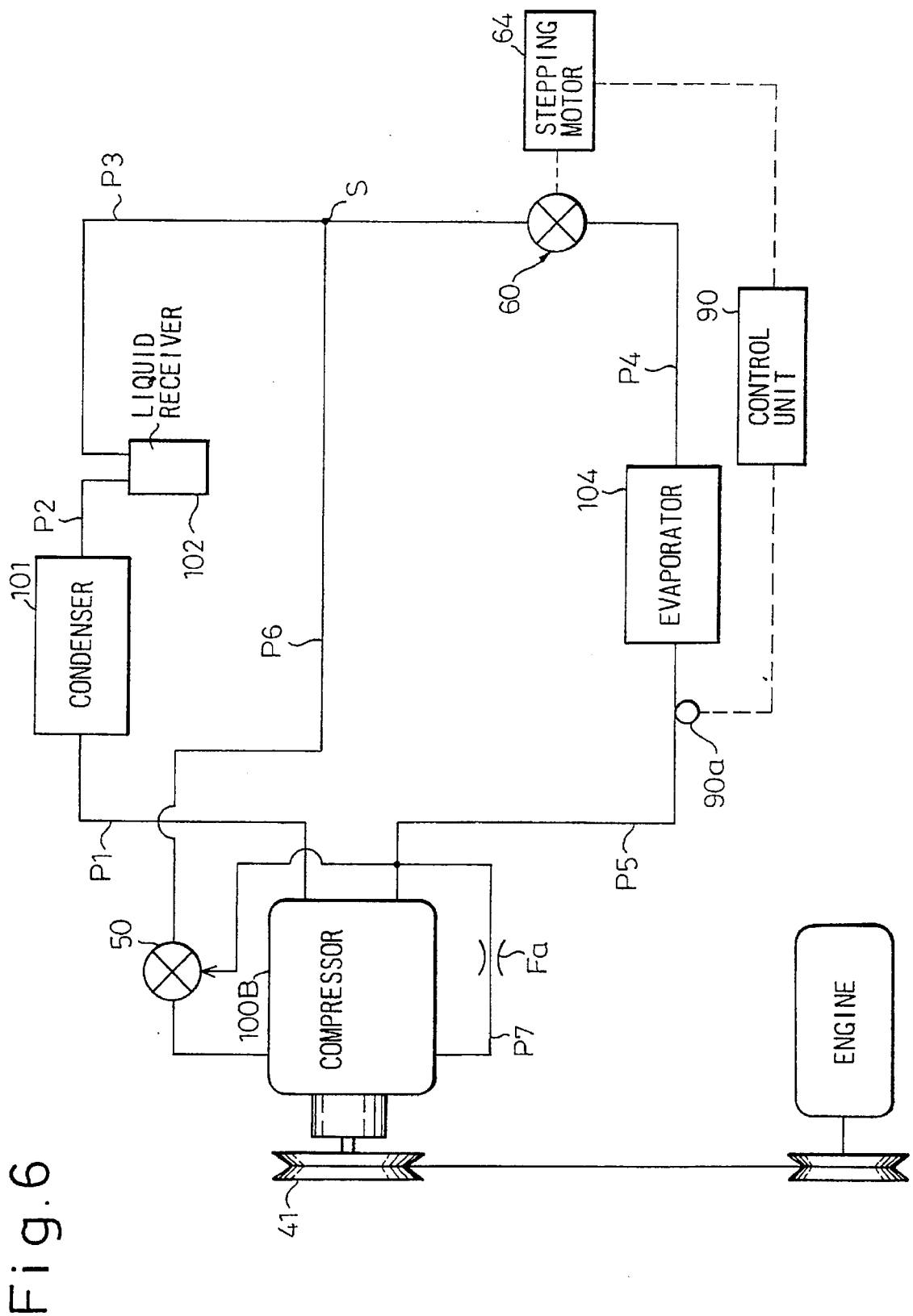
FIG. 6 is a refrigerating system, incorporating a variable capacity refrigerant compressor therein, according to a still further embodiment of the present invention.

FIG. 6 illustrates a refrigerant system according to a further embodiment of the present invention. The refrigerating system of FIG. 6 is different from the system of FIG. 4 in that the solenoid-operated valve 105 disposed in the conduit P3 and the thermal type automatic expansion valve 103 of the latter refrigerating system is replaced with a single electrically operated expansion valve 60 as shown in FIG. 7.

Figure 7:
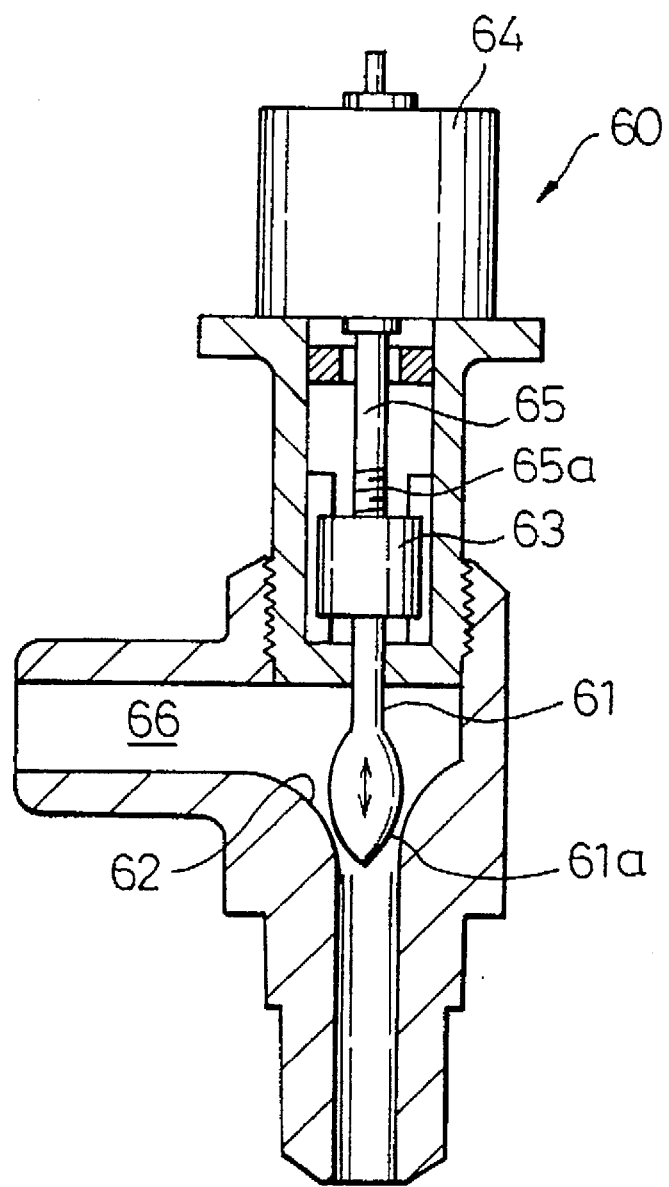
FIG. 7 is a cross-sectional view of an electrically operated expansion valve suitable for being incorporated in the refrigerating system of FIG. 6.

In FIG. 7, the electrically operated expansion valve 60 is provided with a T-shaped valve housing in which a valve unit 61 is axially movably arranged. The valve unit 61 has a valve element 61a at an axial end thereof, and the valve element 61a can be engaged with and disengaged from a valve seat 62 formed in the valve housing. The valve unit 61 has a female threaded portion 63 at another axial end thereof, which is threadedly engaged with a male threaded portion of a rotating shaft 65 of a stepping motor 64. Thus, when the shaft 65 of the stepping motor 64 is rotated, the female threaded portion 63 is linearly moved so as to move the valve element 61a with respect to the valve seat 62. Therefore, the valve port formed, in an inner passageway 66 so as to be enclosed by the valve seat 62, is opened or closed by the valve element 61a in response to the axial movement of the valve element 61a, caused by the stepping motor 64. The inner passageway 66 of the electrically operated expansion valve 60 is connected at one end thereof to the conduit P3 extending from the liquid receiver 102, and at the other end thereof to the conduit P4 extending to the evaporator 104.

As best illustrated in FIG. 6, the electrically operated expansion valve 60 is controlled by a control unit 90. Namely, the control unit 90 is electrically connected, at one end thereof, to the stepping motor 64 of the electrically operated expansion valve 60, and at other end thereof, to a temperature sensing thermistor unit 90a disposed at the outlet of the evaporator 104. Thus, the control unit 90 supplies a drive signal to the stepping motor 64 in response to an output signal of the thermistor 90a indicating temperature of the refrigerant delivered from the outlet of the evaporator 104. The stepping motor 64 adjustably moves the valve unit 61 of the electronic expansion valve 60 to thereby precisely regulate the extent of opening and closing of the valve post of the above-mentioned inner passageway 66 and accordingly, accurately controls the pressure reduction of the refrigerant, in the liquid phase, passing through the inner passageway 66.

Although not shown in FIG. 6, the control unit 90 is electrically connected to an ON-OFF switch arranged in an automobile compartment and accordingly, is able to regulate the operation of the electronic expansion valve 60, via the stepping motor 64, in response to a signal sent by the ON-OFF switch in the automobile compartment.

It should be appreciated that in the refrigerating system according to the embodiment of FIGS. 6 and 7, since the electronic expansion valve 60 having the stepping motor 64 can accurately and precisely achieve fine adjustment of the flow of the refrigerant in cooperation with the control unit 90 and the temperature sensing thermistor 90a, the refrigerating performance and efficiency of the system can be constantly stable. Further, the employment of the expansion valve 60 makes it possible to omit the solenoid-operated valve 105 (FIG. 4) from the refrigerating circuit.

Figure 8:
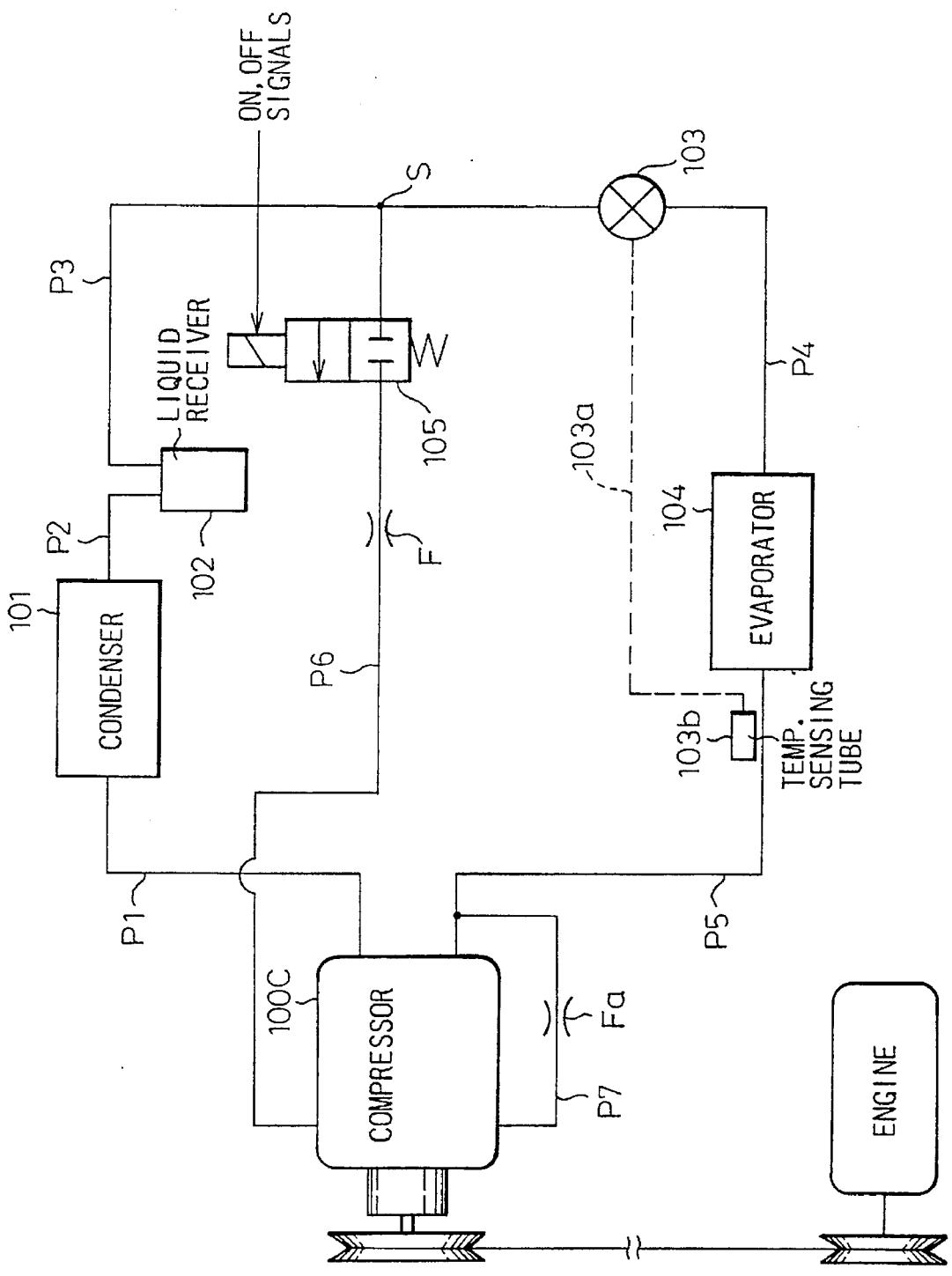
FIG. 8 is a refrigerating system, incorporating a variable capacity refrigerant compressor therein, according to a further embodiment of the present invention.

Referring to FIG. 8 illustrating an automobile refrigerating system of a further embodiment of the present invention, the system basically incorporates therein a non-clutch type compressor 100C, a condenser 101, a liquid receiver 102, a thermal type automatic expansion valve (pressure reducer) 103, an evaporator 104, and refrigerant conduits P1 through P5 for fluidly connecting among the above-mentioned elements. The expansion valve 103 is operatively connected to a temperature sensing tube 103b via a capillary tube 103a, and regulates the flow of the refrigerant passing therethrough in response to a change in the pressure of the gas sealed in the temperature sensing tube 103b.

The refrigerating system of FIG. 8 is characterized in that a refrigerant supply conduit P6 branching (the branching point is designated by "S") from a portion of the refrigerant flow conduits P2 and P3 extending between the condenser 101 and the expansion valve 103 is arranged so as to extend to a crank chamber of the compressor 100C. The refrigerant supply conduit P6 is provided with a choke F and a solenoid-operated valve (two port normally-closed selector valve) 105 incorporated in the conduit. A refrigerant flow conduit P7 is a refrigerant flow passageway internally formed in the compressor 100C and having a choke Fa, but is illustrated as an external conduit connected to the refrigerant flow conduit P5 only for convenience.

Figure 9:
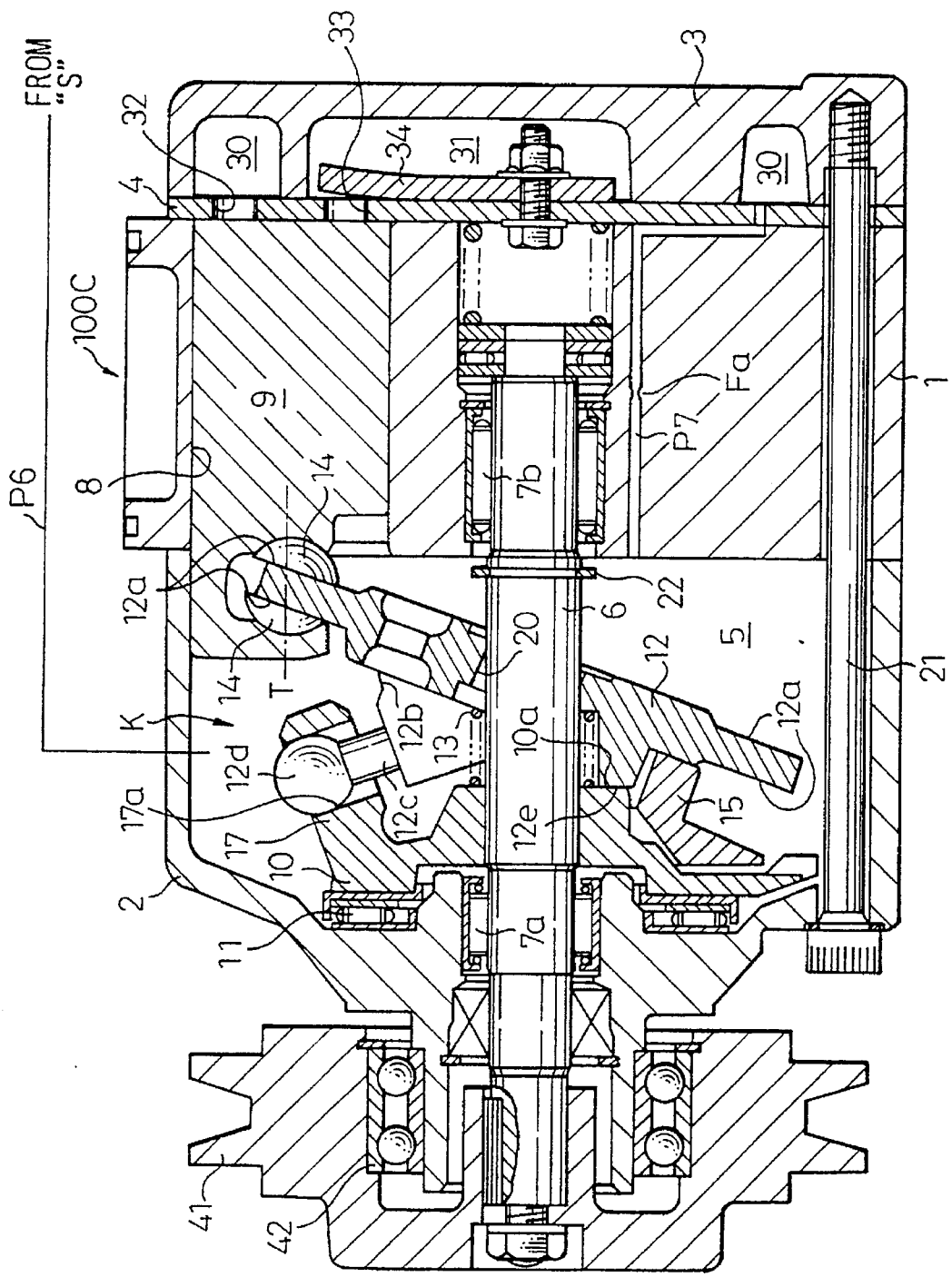
FIG. 9 is a non-clutch type variable capacity refrigerant compressor suitable for incorporation in the refrigerating system of FIG. 8.

The internal construction of the non-clutch compressor 100C shown in FIG. 9 is the same as that of the aforementioned non-clutch type compressor of FIG. 5, and therefore, a description of the internal construction of the compressor 100C is omitted for the brevity. It should be noted that the operation of the compressor 100C starts in response to the start of the automobile engine, due to the direct transmission of a drive force from the engine via a pulley 41 and a belt (not shown) without intervention of a clutch device.

When the compressor 100C operates, and when the solenoid-operated valve 105 is closed by a signal provided by a manual operation of a predetermined switch on the control panel in the automobile compartment, the refrigerating system of FIG. 8 starts to work, i.e., the refrigerant is circulated through the compressor 100C, the condenser 101, the liquid receiver 102, the expansion valve 103, and the evaporator 104 via the refrigerant flow conduits P1 through P5. Thus, the air flowing around the evaporator 104 is subjected to refrigeration due to removal of heat from the air by the refrigerant passing inside the evaporator 104. The refrigerated air is supplied to the compartment of the automobile as a cooling air. The refrigerant in the evaporator 104 is evaporated, and flows toward the suction chamber 30 of the compressor 100C.

When refrigerating operation of the system is not required, the solenoid-operated valve 105 is switched to its open position by the signal provided by the switch, and the refrigerant supply conduit P6 is made open. Thus, a part of the high pressure liquid-phase refrigerant flowing from the condenser 101 and the liquid receiver 102 to the branching point S is supplied to the crank chamber 5 of the compressor 100C so as to increase the pressure prevailing in the crank chamber 5. Therefore, the swash plate 12 is moved to a position where the angle of inclination of the swash plate 12 is sufficiently moved towards the minimum angle condition. Accordingly, the capacity of the compressor 100C is reduced to the minimum, and only a small amount of the compressed refrigerant gas is delivered from the compressor 100C toward the condenser 101. Namely, the refrigerant delivered from the compressor 100C can be circulated through the condenser 101, the liquid receiver 102, the refrigerant supply conduit P6, the crank chamber 5 of the compressor 100C, the gas extraction passageway P7, the suction chamber 30, the cylinder bores 8, and the discharge chamber 31. As a result, as the circulated refrigerant can be cooled and liquified by the condenser 101, and is subjected to a pressure reduction when it passes through the choke F in the refrigerant supply conduit P7, when the refrigerant enters the crank chamber 5, it is always vaporized within the crank chamber 5 while cooling the compressor 100C. Further, lubricating oil droplets mixedly held by the liquid phase refrigerant are separated from the vaporized refrigerant and are stored within the crank chamber 5. Thus, the stored lubricating oil contributes to the lubrication of the interior of the compressor 100C. It will be easily understood that the operation of the compressor 100C with the swash plate 12 at the minimum inclination-angle position applies only the smallest possible load to the automobile engine except for a frictional loss due to the movement of the various internal elements of the compressor 100C. Thus, the automobile engine is not adversely affected by the continuous operation of the non-clutch compressor 100C. Further, the gas extraction passageway P7 is arranged in such a manner that one of the ends of the passageway P7 opens toward the crank chamber 5 at a position adjacent to the axis of rotation of the drive shaft 6. Accordingly, the gas extraction passageway P7 can prevent the liquid-phase refrigerant from flowing from the crank chamber 5 to the suction chamber 30. Namely, a direct return of the liquid-phase refrigerant from the crank chamber 5 to the suction chamber 30 is successfully prevented.

Figure 10:
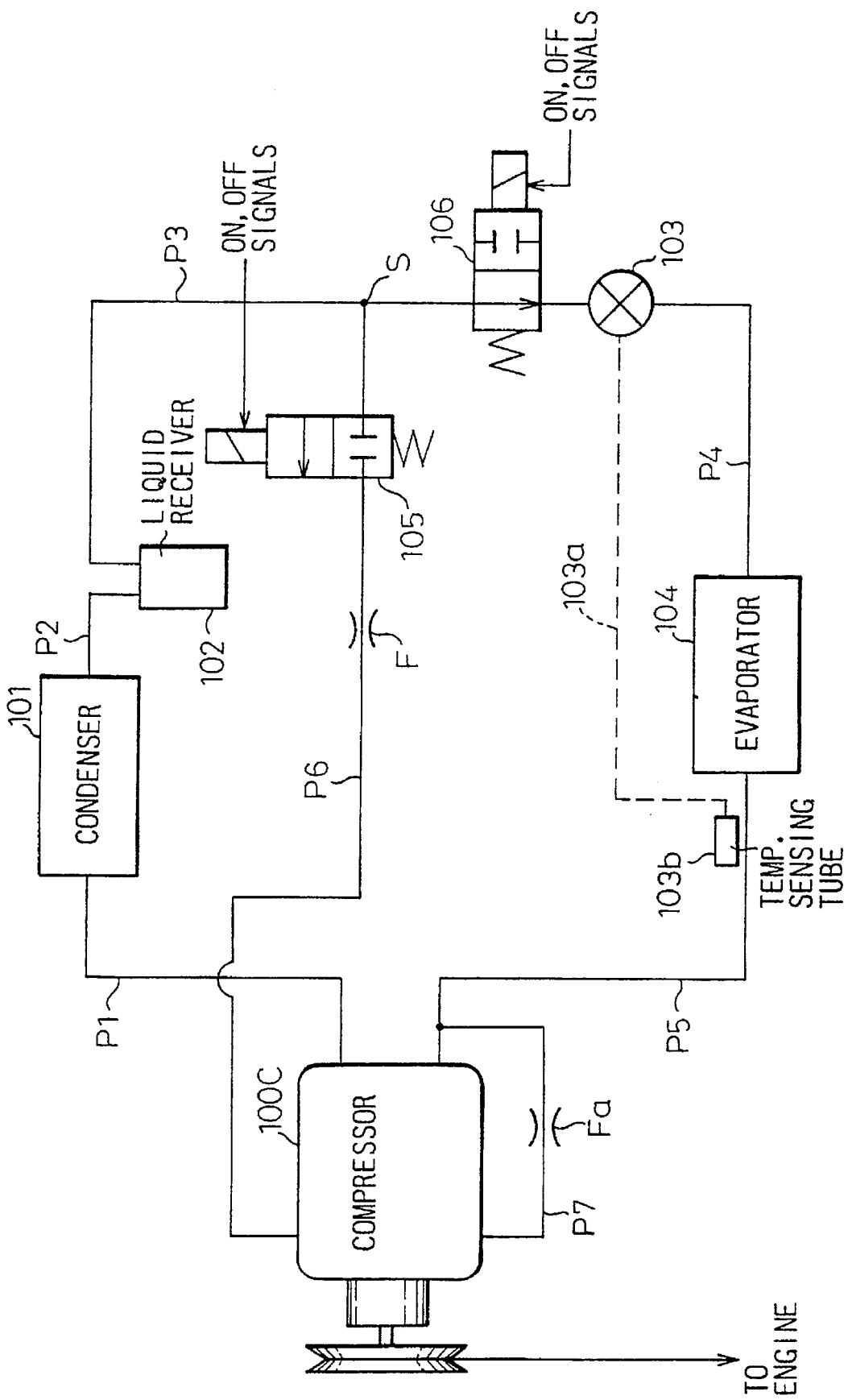
FIG. 10 is a refrigerating system incorporating a variable capacity refrigerant compressor therein, according to a further embodiment of the present invention.

FIG. 10 illustrates a refrigerating system which employs the above-described non-clutch type compressor 100C, but is modified from the refrigerating system of FIG. 8 in such a manner that an additional solenoid-operated valve 106 (a normally open two port selector valve) is provided in the refrigerant conduit P3 at a position between the branching point S of the refrigerant supply conduit P6 and the expansion valve 103. The solenoid-operated valve 106 is moved from the normally open position to the close position and vice versa by ON and OFF signals supplied from the control panel in the automobile compartment. Namely, the movement of the solenoid-operated valve 106 from its normally open position to the close position occurs synchronously with the movement of the afore-mentioned solenoid-operated valve 105 in the refrigerant supply conduit P6 from its normally close position to the open position. The provision of the solenoid-operated valve 106 can prevent a part of the liquid-phase refrigerant containing lubricating oil droplets therein from flowing toward the evaporator 104 through the expansion valve 103 and the refrigerant conduit P4 during the operation of the compressor 100C with the swash plate 12 at the minimum inclination angle position. Although the lubricating oil contained in the refrigerant is apt to stay in the evaporator 104, and to deteriorate the evaporating performance of the evaporator 104, the solenoid-operated valve 106 can protect the evaporator 104. Namely, it will be understood that the refrigerating system of FIG. 10 is an improvement over the system of FIG. 8.

Figure 11:
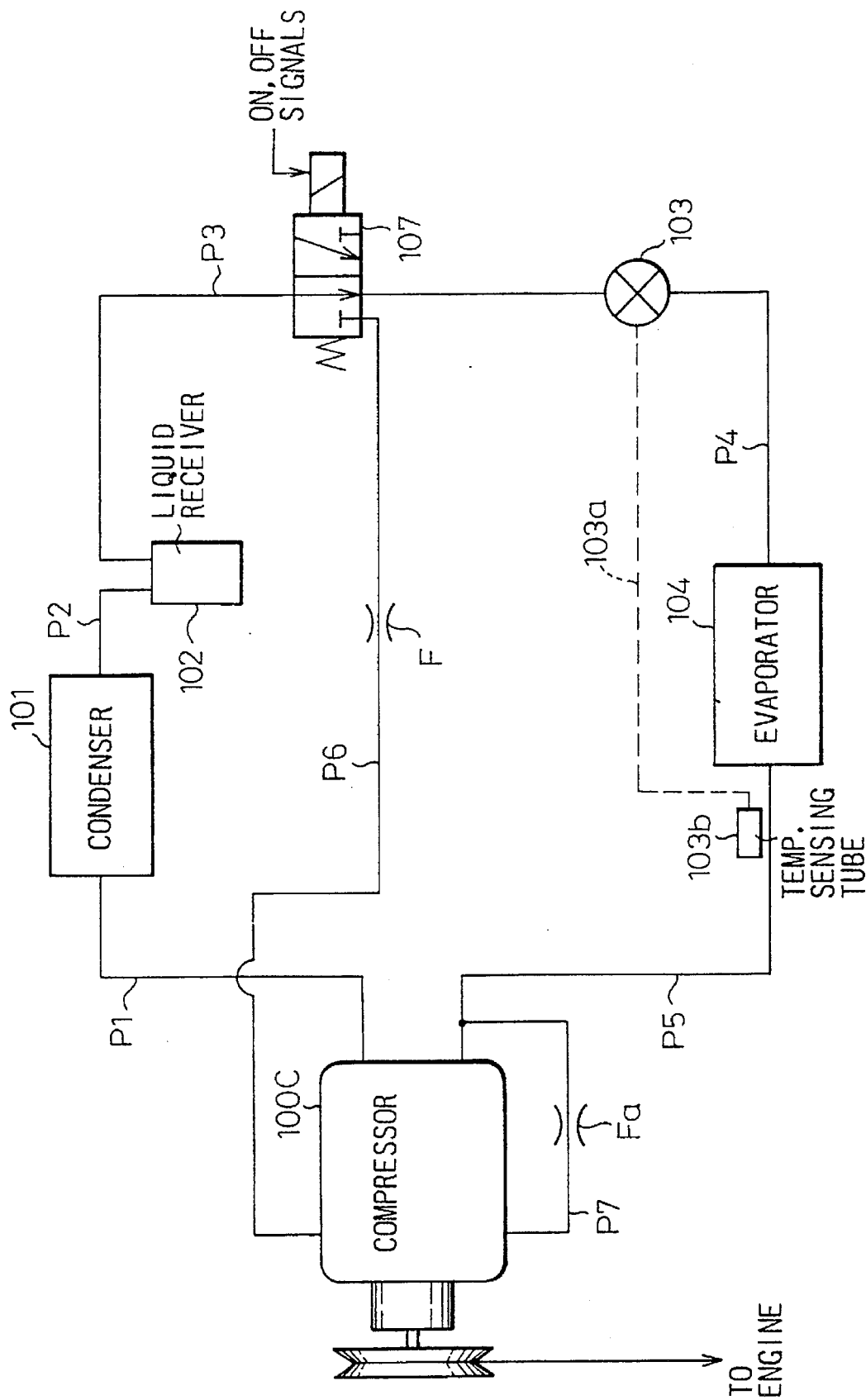
FIG. 11 is a refrigerating system according to a modification of the system of FIG. 10.

FIG. 11 illustrates another refrigerating system modified from the system of FIG. 8, in which the solenoid-operated valve 105 (normally closing two port selector valve) of FIG. 8 is replaced with a solenoid-operated valve 107 consisting of a three port selector valve. The solenoid-operated valve 107 is arranged in the refrigerant conduit P3 at a position corresponding to the branching point S of the refrigerant supply conduit P6, so that the solenoid-operated valve 107 is moved from a first position (the normally open position as shown in FIG. 11) to a second position whereat the valve 107 provides a fluid communication between the refrigerant supply conduit P6 and the condenser 101 via the liquid receiver 102 and the refrigerant conduit P3, while simultaneously interrupting a fluid communication between the liquid receiver 102 and the expansion valve 103 via the refrigerant conduit P3. Thus, the solenoid-operated valve 107 can act as a combination of the afore-mentioned two solenoid-operated valves 105 and 106 of the refrigerating system of FIG. 10. Accordingly, it will be understood that the refrigerating system of FIG. 11 is improved over that of FIG. 8.

Figure 12:
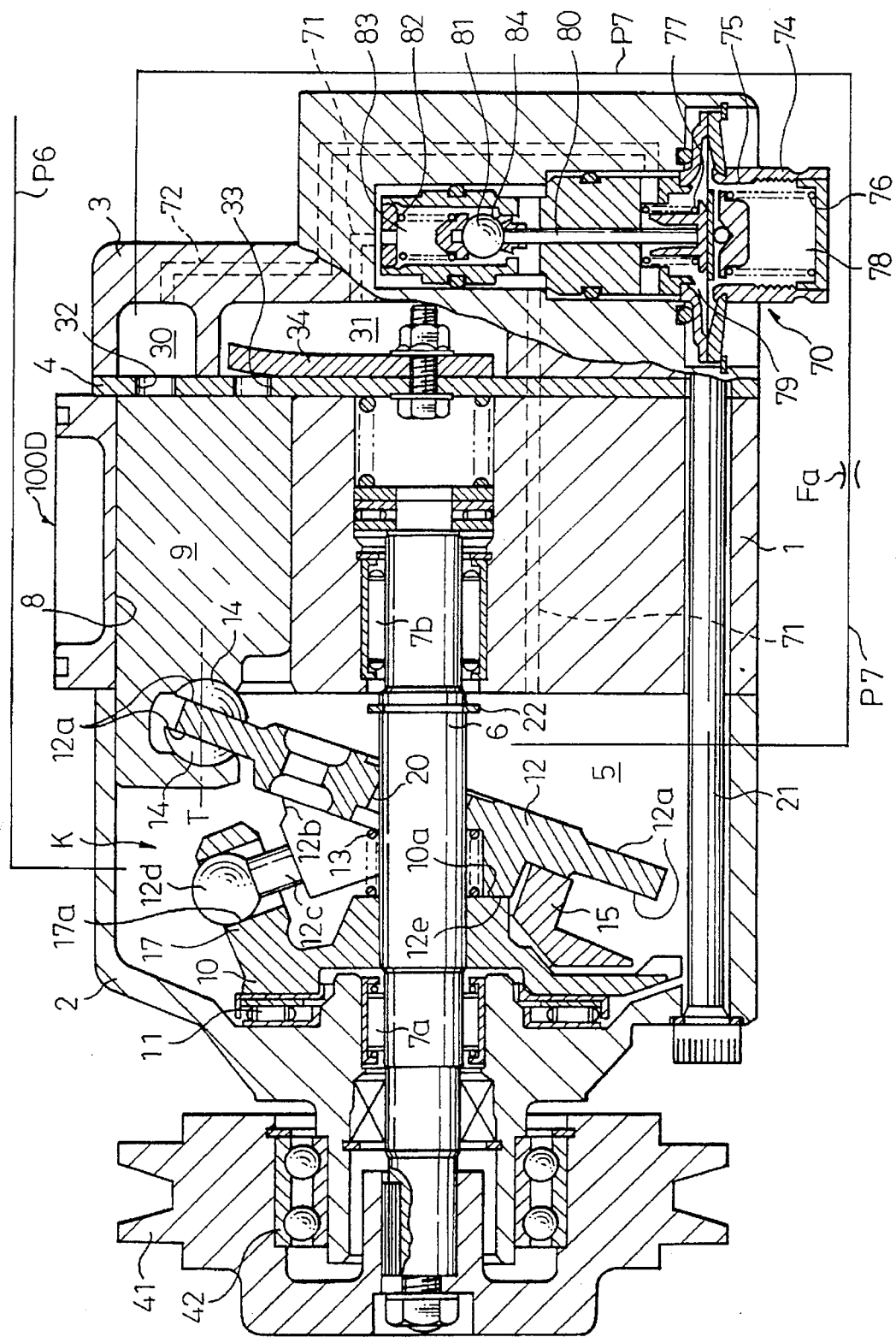
FIG. 12 is a non-clutch type variable capacity refrigerant compressor different from the compressor of FIG. 9 and suitable for incorporation in the refrigerating system according to the present invention.

FIG. 12 illustrates a different non-clutch type refrigerant compressor 100D which includes a built-in capacity control valve 70 capable of regulating the pressure in the crank chamber 5 in response to a detected change in the suction pressure of the gas-phase refrigerant received by the suction chamber 30.

As clearly shown in FIG. 12, the capacity control valve 70 is received in the rear housing 3 of the compressor 100D, and is arranged so as to regulate a flow of the refrigerant gas from the discharge chamber 31 to the crank chamber 5 via a gas supply passageway 71. The capacity control valve 70 is provided with a casing 74 in which a diaphragm 75 is disposed so as to define an atmospheric pressure chamber 78 on one side of the diaphragm 75, and a suction pressure chamber 79 on the side of the diaphragm 75. On both sides of the diaphragm 75, a pair of springs 76 and 77 are arranged to apply mutually opposing forces to the diaphragm 75. The suction pressure chamber 79 is fluidly communicated with the suction chamber 30 via a suction pressure detecting passageway 72 so as to apply a suction pressure to the diaphragm 75. A rod 80 is arranged in the suction pressure chamber 79 so as to be connected to the diaphragm 75 at an end thereof, and the other end of the rod 80 extends into a control chamber 63 defined in a hollow cylindrical valve body sealingly fitted in a cylindrical bore of the rear housing 3. The rod 80 is provided with a ball type valve element 81 at the other end thereof. The control chamber 83 is fluidly communicated with the discharge chamber 31 via a part of the above-mentioned refrigerant supply passageway 71 and with the crank chamber 5 via a valve port surrounded by a valve seat 84 and via a different part of the refrigerant supply passageway 71. The valve port surrounded by the valve seat 84 is opened or closed by the ball type valve element 81 which is urged by a spring 82 toward its closing position where the ball type valve element 81 is seated in the valve seat 84. The ball type valve element 81 is moved away from its closing position to its opening position whereat the ball type valve element 81 opens the valve port surrounded by the valve seat 84. Thus, when the suction pressure is lower than a predetermined pressure level, the diaphragm 75 is moved so as to axially move the rod 80 to thereby move the ball type valve element 81 from its close position to the open position. Thus, the refrigerant supply passageway 71 is opened at the valve port, so that the discharge chamber 31 and the crank chamber 5 are fluidly communicated. Therefore, a high pressure refrigerant gas is supplied from the discharge chamber 31 to the crank chamber 5, and controls the pressure prevailing in the crank chamber 5. As a result, the angle of inclination of the swash plate 12 is adjustably changed so as to change the piston stroke of the respective pistons 9. Eventually, the pressure of the refrigerant gas received in the suction chamber 30 can be adjustably changed. Namely, the built-in type capacity control valve 70 operates so as to regulate the pressure in the suction chamber 30 at a constant level during the operation of the compressor 100D.

When the non-clutch type compressor 100D provided with the above-mentioned built-in type capacity control valve 70 is incorporated in an automobile refrigerating system as shown in e.g., FIG. 10, the capacity control valve 70 operates so as to prevent the suction pressure in the suction chamber 30 from changing from a constant pressure level, even when the compressor per se operates at the minimum delivery capacity condition thereof due to a supply of the liquid-phase refrigerant via the refrigerant supply conduit P6. Nevertheless, during the operation of the compressor 100D at its minimum delivery capacity, a part of the compressed refrigerant is circulated through the condenser 101, and the refrigerant conduits P1, P2, P3, and P6, the non-clutch type compressor 100D can be successfully cooled and lubricated as in the case of the afore-mentioned compressors 100A, 100B, and 100C.

Figure 13:
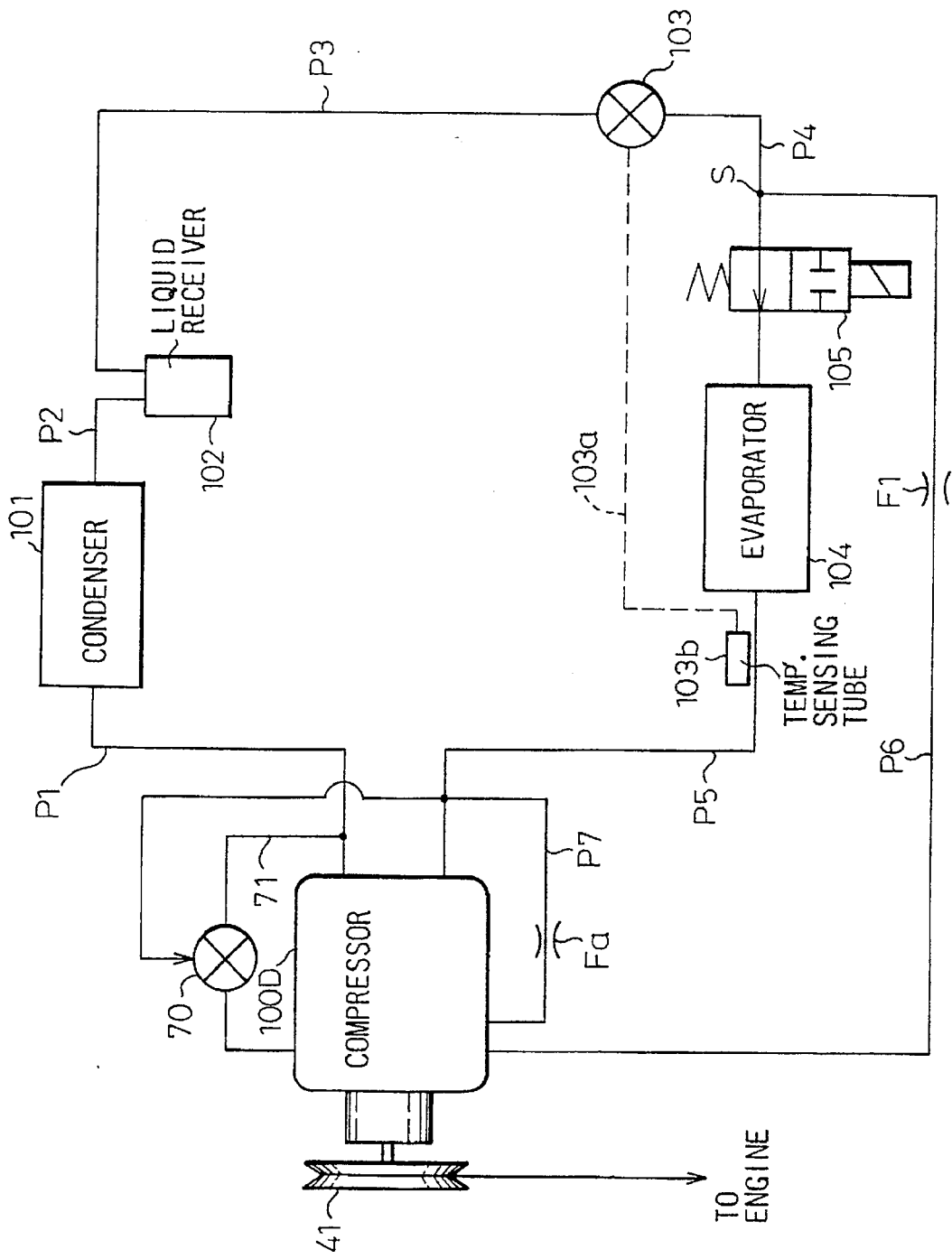
FIG. 13 is a refrigerating system incorporating a variable capacity refrigerant compressor therein, according to a further embodiment of the present invention.

Referring to FIG. 13, a refrigerating system for an automobile compartment according to a further different embodiment of the present invention, a basic refrigerant circulating system of the refrigerating system including a non-clutch type compressor substantially the same as the compressor 100D of FIG. 12, a condenser 101, a liquid receiver 102, an expansion valve (pressure reducing valve) 103, an evaporator 104, and refrigerant conduits P1 through P5 is the same as those of the refrigerant circuits according to the previous embodiments. Further, the expansion valve 103 is similar to the thermal type automatic expansion valves of FIGS. 1, 3, 4, 8, 10 and 11, and therefore, is connected, via a capillary tube 103a, to a temperature sensing tube 103b capable of detecting the temperature at the outlet of the evaporator 104.

In the refrigerating system of FIG. 13, a solenoid-operated valve 105 consisting of a normally opening type two port type selector valve is arranged in the refrigerant conduit P4 at a position upstream the evaporator 104, and a refrigerant supply conduit P6 having a choke F1 is branched from the conduit P4 at a position S so as to extend to the crank chamber 5 of the compressor 100D. The branching position S is arranged between the above-mentioned solenoid-operated valve 105 and the expansion valve 103. A refrigerant conduit P7 having a choke Fa is arranged between the crank chamber 5 and the suction chamber 30 as a gas extracting passageway formed in the compressor 100D to extract the refrigerant gas from the crank chamber 5 to the suction chamber 30. Nevertheless, in FIG. 13, the refrigerant conduit P7 is shown as an external conduit for brevity.

It should be understood that the cross-sectional area of the choke F1 of the conduit P6 is designed so as to be considerably smaller than that of the choke Fa of the conduit P7.

Further, the capacity control valve 70 usually received in the rear housing 3 of the compressor 100D as a built-in type capacity control valve is illustrated in FIG. 13 as an external element of the compressor 100D for convenience.

The operation of the refrigerating system of FIG. 13 will be described below. It should, however, be noted that the operation of the refrigerating system of FIG. 13 is not basically different from those of the afore-mentioned various embodiments.

In an ordinary operation of the circuit, when an automobile engine is started, the drive shaft 6 of the compressor 100D is immediately rotated by a drive force directly transmitting from the engine to the drive shaft 6 via a belt and the pulley 41. Thus, the compressor 100D operates so as to suck and compress a refrigerant gas flowing from the evaporator 104 into the suction chamber 30 of the compressor 100D via the refrigerant conduit P5, and to discharge the compressed gas from the discharge chamber 31 toward the condenser 101 via the refrigerant conduit P1.

The compressed refrigerant gas at a high temperature and a high pressure is condensed to become liquid-phase refrigerant, and delivered to the liquid receiver 102 via the refrigerant conduit P2. The liquid-phase refrigerant then flows toward the expansion valve 103 via the refrigerant conduit P3, and is adiabatically expanded there to become a mist-like refrigerant (a mixture of liquid and gas) at a low temperature and a low pressure. The expansion valve 103 further regulates a flow of the mist-like refrigerant flowing therethrough toward the evaporator 104 via the solenoid-operated valve 105 (the normally opening two port selector valve) in the refrigerant conduit P4, in response to a temperature detected by the temperature sensing tube 103b. In the evaporator 104, the refrigerant is vaporized to become a gas-phase refrigerant by removing heat from the air in the automobile compartment, so that the cold air cools the automobile compartment. The gas-phase refrigerant is delivered from the evaporator 104 toward the compressor 100D via the refrigerant conduit P5, and is then sucked into the suction chamber 30.

During the above-mentioned refrigerating operation, a part of the refrigerant delivered from the expansion valve 103 is supplied into the crank chamber 5 of the compressor 100D through the refrigerant supply conduit P6 via the choke F1. Nevertheless, the refrigerant entering the crank chamber 5 does not adversely affect on the capacity controlling action of the compressor 100D. Namely, it should be noted that pressure of the refrigerant measured at the branching point S of the refrigerant supply conduit P6 is only 1 kgf/cm$^2$ higher than the suction pressure of the gas-phase refrigerant measured at the inlet to the compressor 100D, and that the refrigerant delivered from the expansion valve 103 is vaporized due to being subjected to expansion (pressure reduction) by the expansion valve 103. Further, the cross-sectional area of the choke Fa of the gas extraction conduit P7 is designed and set so as to be larger than that of the choke F1 of the refrigerant supply conduit P6. Therefore, the amount of the refrigerant extracted by the gas extraction conduit P7 is larger than the amount of the refrigerant entering the crank chamber 5 from the refrigerant supply conduit P6. Accordingly, during the ordinary operation of the refrigerating circuit, the delivery capacity control for the compressor 100D can be successfully performed by the capacity control valve 70.

On the other hand, when the refrigeration of the air is not required during the continuous operation of the compressor 100D, the solenoid-operated valve 105 is switched to its closing position opposite to its opening position shown in FIG. 13. Thus, the refrigerant conduit P4 from the expansion valve 103 to the evaporator 104 is interrupted. Thus, the capacity control valve 70 detects a reduction in the suction pressure of the refrigerant entering the suction chamber 30 of the compressor 100D, and immediately opens the conduit 71 so as to introduce the refrigerant, at high pressure and from the discharge chamber 31, into the crank chamber 5 to thereby increase a pressure level prevailing in the crank chamber 5. Therefore, the swash plate 12 is moved to its minimum inclination angle position in order to reduce the piston stroke of the respective pistons of the compressor 100D. Thus, the capacity of the compressor 100D is reduced to the minimum condition.

Further, when the solenoid-operated valve 105 is moved to its closing position, interrupting the flow of the refrigerant toward the evaporator 104, the refrigerant flows toward the refrigerant supply conduit P6 via the branching point S of the refrigerant conduit P4. At this stage, the refrigerant is pressurized due to the above-mentioned interruption of the refrigerant conduit P4 extending toward the evaporator 104, and accordingly, the vaporizing of the refrigerant by the expansion valve 103 is suppressed. Therefore, the pressurized refrigerant in the liquid-phase is sufficiently supplied into the crank chamber 5 via the refrigerant supply conduit P6 to increase the pressure level in the crank chamber 5. Therefore, the capacity of the compressor 100D is quickly reduced to a minimum. Thereafter, during the minimum capacity operation of the compressor 100D, a small amount of the refrigerant is continuously circulated through the discharge chamber 31, the condenser 101, the liquid receiver 102, the expansion valve 103, the refrigerant supply conduit P6, the crank chamber 5, the gas extraction conduit P7, the suction chamber 30, the respective cylinder bores 8, and the discharge chamber 31. The liquid-phase refrigerant entering the crank chamber 5 is always vaporized, and accordingly, cools the compressor 100D. Moreover, lubricating oil droplets suspended in the refrigerant entering the crank chamber 5 can be stored therein, and can contribute to the lubrication of the various moving elements of the compressor 100D.

Figure 14:
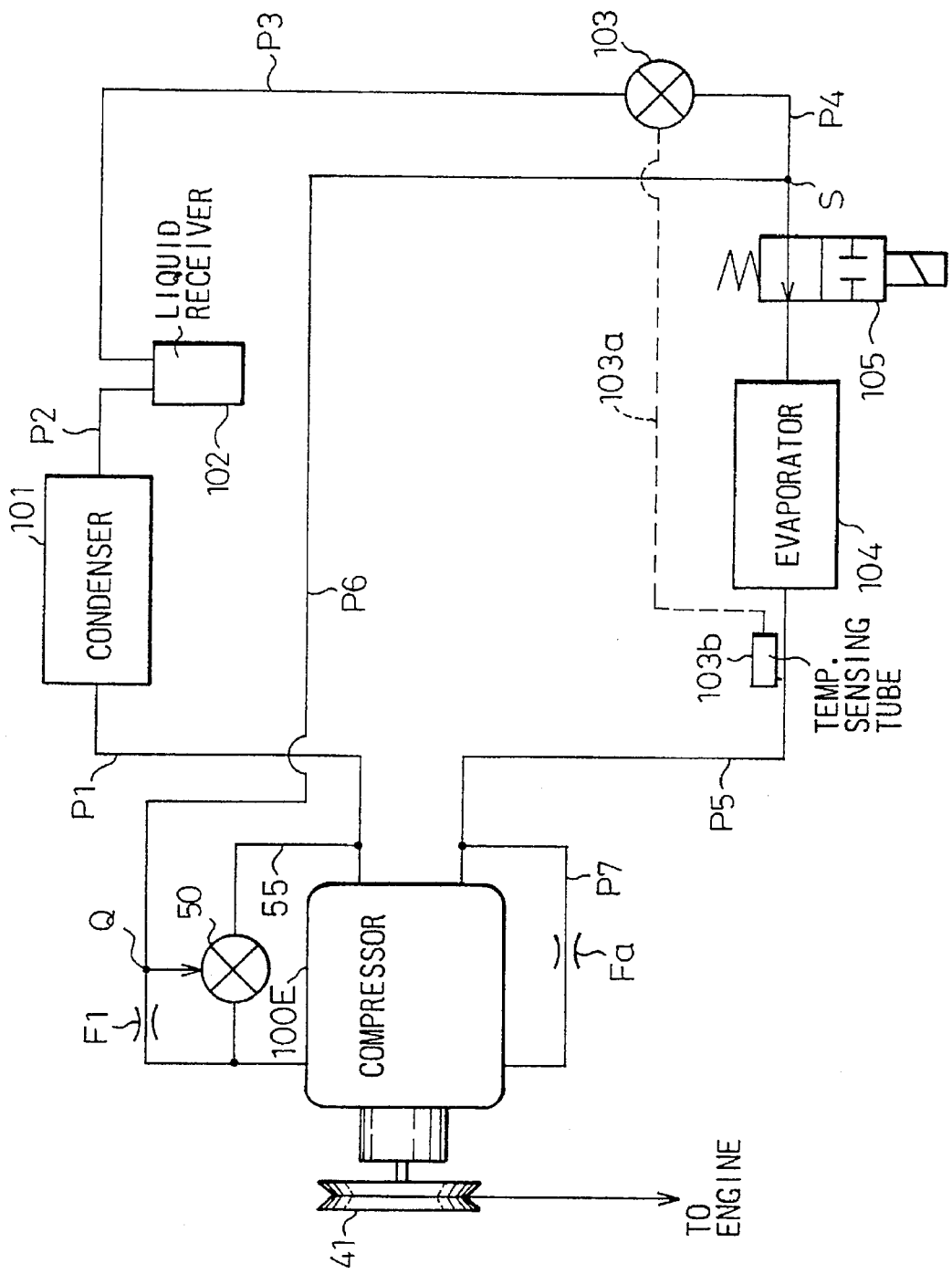
FIG. 14 is a refrigerating system incorporating a variable capacity refrigerant compressor therein, according to a still further embodiment of the present invention.

FIG. 14 illustrates a refrigerating system according to a further embodiment of the present invention. The refrigerating system of FIG. 14 is different from the system of FIG. 13 in that the compressor 100D incorporating therein the built-in type capacity control valve 70 is replaced with a non-clutch type variable capacity refrigerant compressor 100E provided with an externally arranged capacity control valve 50 having an internal construction substantially the same as that of the valve 50 shown in FIG. 2 or in FIG. 5. Further, the capacity control valve 50 of the refrigerating system of FIG. 14 is arranged so as to carry out the capacity control operation in response to a change in a pressure of the refrigerant flowing in the refrigerant supply conduit P6. The detecting point of the above-mentioned pressure of the refrigerant is shown by "Q" in FIG. 14. It should be noted that the choke F1 in the refrigerant conduit P6 is arranged downstream of the pressure detecting point Q.

Figure 15:
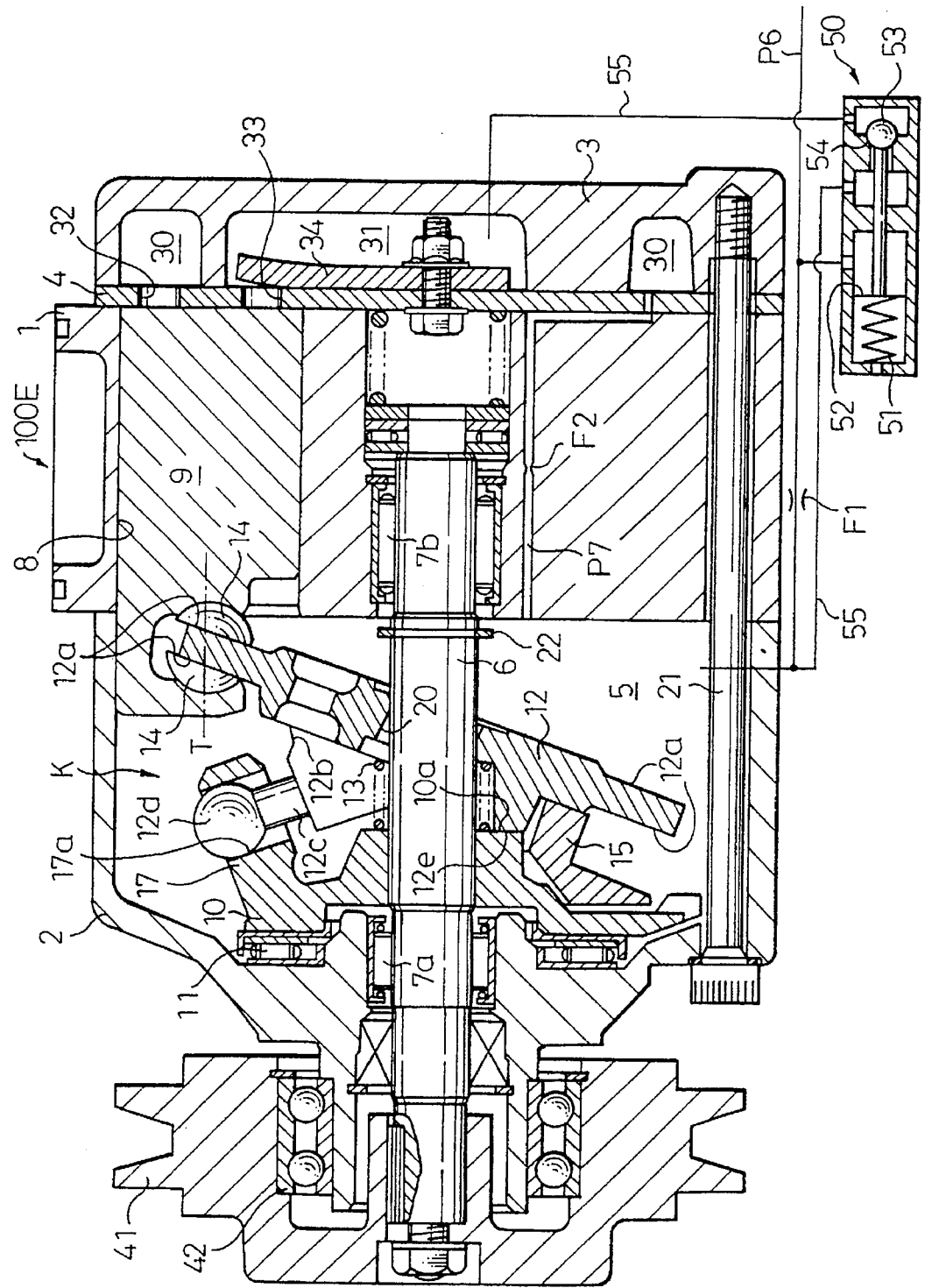
FIG. 15 is a cross-sectional view of a non-clutch variable capacity type refrigerant compressor and a capacity control valve, suitable for incorporating in a refrigerating system according to the present invention.

FIG. 15 illustrates the construction of the compressor 100E provided with the capacity control valve 50. The internal construction of the compressor 100E is the same as the afore-mentioned compressor 100B of FIG. 5. Therefore, the description of the internal construction of the compressor 100E is omitted here for brevity.

The externally arranged capacity control valve 50 is arranged in the refrigerant conduit 55, and regulates the flow of the gas-phase refrigerant, at high pressure, which flows from the discharge chamber 31 to the crank chamber 5 of the compressor 100E, in response to the detection of the pressure of the gas-phase refrigerant at the point Q. The capacity control valve 50 is provided with a diaphragm 52 constantly urged by a compression spring 51, a valve element 53 connected to the diaphragm 52 via a valve rod, and a valve seat 54 surrounding a valve port provided in the refrigerant conduit 55. The valve port surrounded by the valve seat 54 is normally open, and is closed by the valve element 53 when the pressure of the refrigerant detected at the point Q in the refrigerant conduit P6 overcomes the spring force of the compression spring 51 so as to move the valve element 53 into engagement with the valve seat 54.

In the refrigerating system of FIG. 14, when the solenoid-operated valve 105 is set at its open position, the pressure of the refrigerant measured at the branching point S of the refrigerant supply conduit P6 is substantially the same as the pressure of the refrigerant measured at the outlet of the evaporator 104. Therefore, the capacity control valve 50 can control the delivery capacity of the compressor 100E in such a manner that the pressure of the refrigerant at the outlet of the evaporator 104 is accurately controlled.

On the other hand, when the solenoid-operated valve 105 is moved to its closing position to stop the refrigerating operation of the circuit, the capacity control valve 50 is moved to its closing position interrupting the conduit 55 in response to an increase in the pressure of the refrigerant detected at the point Q. Thus, the supply of the gas-phase refrigerant, at high pressure, from the discharge chamber 31 to the crank chamber 5 is stopped. Nevertheless, the liquid-phase refrigerant is supplied from the refrigerant conduit P4 to the crank chamber 5 of the compressor 100E via the branching point S, the refrigerant supply conduit P6, and the choke F1. Accordingly, as described with the aforementioned various embodiments, the compressor 100E can operate at the minimum delivery capacity while being appropriately cooled and successfully lubricated.

FIG. 16 illustrates a refrigerating system according to a further embodiment of the present invention. The refrigerating system of FIG. 16 is different from that of FIG. 14 in that the capacity control valve 50, the refrigerant conduit 55 and the pressure detecting conduit are omitted. Therefore, during the ordinary refrigerating operation of the circuit, controlling of the delivery capacity of the compressor 100E is not carried out.

Nevertheless, when the solenoid-operated valve 105 is moved from its normally-opening position to its closing position interrupting the refrigerant conduit P4 upstream of the evaporator 104, the refrigerant in the liquid phase is supplied to the crank chamber 5 of the compressor 100E via the refrigerant supply conduit P6 in response to the suction pressure of the refrigerant gas in the suction chamber 30 of the compressor 100E. Thus, the operation of the compressor 100E is changed to its minimum delivery capacity condition due to a movement of the swash plate 12 to its minimum inclination angle position to reduce the piston stroke. During the minimum capacity operation of the compressor 100E, a small amount of the refrigerant circulates through the compressor 100E, the condenser 101, the liquid receiver 102, the expansion valve 103, and the refrigerant supply conduit P6. Thus, as described with the various previous embodiments of the present invention, the compressor 100E can operate at the minimum delivery capacity thereof while being appropriately cooled and successfully lubricated.

From the foregoing description of the preferred embodiments of the present invention, it will be understood that, according to the present invention, a refrigerating system for automobile compartments, incorporating a variable capacity type reciprocating piston-operated refrigerant compressor, can operate in such a manner that even when the refrigerating of the air supplied into the automobile compartment for air-conditioning is not required, the compressor can operates at the minimum capacity condition while appropriate cooling and lubrication is applied to the compressor. Thus, a long life of the compressor and, accordingly, the refrigerating system per se can be guaranteed irrespective of the compressor being a clutch-mounted type compressor or a non-clutch type compressor. Therefore, the reliability of the operation of the refrigerating system can be increased.

Many further variations and modifications will occur to persons skilled in the art without departing from the scope and spirit of the invention covered by the accompanying claims.

We claim:

1. A refrigerating system for air-conditioning area which incorporates, in a refrigerant conduit means, a variable capacity refrigerant compressor including:

a housing means for defining therein a suction chamber for a refrigerant before compression, a discharge chamber for the refrigerant after compression, and a crank chamber;

a cylinder block having therein a plurality of cylinder bores;

a plurality of pistons arranged to reciprocate in the plurality of cylinder bores;

a drive shaft supported by said housing means via anti-friction bearings and rotated by a drive force transmitted from a drive source;

a swash plate means arranged in said crank chamber so as to rotate together with said drive shaft and to change its angle of inclination with respect to a plane perpendicular to the axis of rotation of said drive shaft in response to a change in a pressure prevailing in said crank chamber to thereby adjustably change a stroke of said respective pistons;

a gas extraction passageway means arranged to provide a fluid communication between said crank and suction chambers;

a condenser means for condensing the compressed gas-phase refrigerant delivered by said variable capacity refrigerant compressor and delivering the refrigerant in liquid-phase;

a pressure reducing means for reducing the pressure of the liquid-phase refrigerant;

an evaporator means for evaporating the liquid-phase refrigerant delivered by said pressure reducing means so as to remove heat from the air around said evaporator means and which cools the air-conditioned area;

a refrigerant supply conduit means for supplying said crank chamber of said variable capacity refrigerant compressor with a part of the liquid-phase refrigerant flowing in a portion of said refrigerant conduit means extending from said condenser means to said evaporator means; and, a flow regulating means for adjustably regulating the flow of the liquid-phase refrigerant flowing through said refrigerant supply conduit means whereby the pressure in the crank chamber is adjusted to change the stroke of the pistons.

2. A refrigerating system according to claim 1, wherein said pressure reducing means comprises an expansion valve means for permitting expansion of the liquid-phase refrigerant to thereby convert said liquid-phase refrigerant into a mist-like refrigerant.

3. A refrigerating system according to claim 1, wherein said variable capacity refrigerant compressor comprises a non-clutch type variable capacity refrigerant compressor, said drive shaft of said non-clutch type variable capacity refrigerant compressor being rotatively driven by a drive force transmitting from said drive source without the intervention of a clutch unit therebetween.

4. A refrigerating system according to claim 3, wherein said refrigerant supply conduit means comprises a branch conduit means branching from a portion of said refrigerant conduit means running from said condenser means to said pressure reducing means, said branch conduit means extending to said crank chamber of said non-clutch type variable capacity refrigerant compressor, and said flow regulating means comprises a valve means arranged in said branch conduit means for regulating a flow of the liquid-phase refrigerant supplied from said portion of said refrigerant conduit means to said crank chamber of said non-clutch type variable capacity refrigerant compressor.

5. A refrigerating system according to claim 4, wherein said valve means of said flow regulating means comprises at least one two-port selector valve.

6. A refrigerating system according to claim 5, wherein said valve means of said flow regulating means further comprises an additional two-port selector valve arranged in said refrigerant flow conduit means extending between a branching point of said branching conduit means and said pressure reducing means.

7. A refrigerating system according to claim 6, wherein said first-mentioned and additional two port selector valves of said valve means of said flow regulating means comprise solenoid-operated selector valves operated by electric ON and OFF signals.

8. A refrigerating system according to claim 4, wherein said valve means of said flow regulating means comprises a three-port selector valve arranged in said refrigerant conduit at a branching point of said branch conduit means forming said refrigerant supply conduit means.

9. A refrigerating system according to claim 8, wherein said three-port selector valve comprises a solenoid-operated valve operated by electric ON and OFF signals.

10. A refrigerating system according to claim 1, wherein said gas extraction passageway means has an end opening toward said crank chamber and located at a position adjacent to said drive shaft of said variable capacity refrigerant compressor.

11. A refrigerating system according to claim 1, wherein a capacity control valve means for controlling a delivery capacity of said variable capacity refrigerant compressor is provided in a portion of said refrigerating circuit, said capacity control valve means operating in response to a change in the pressure of the refrigerant sucked into said suction chamber of said variable capacity refrigerant compressor.

12. A refrigerating system according to claim 3, wherein said refrigerant supply conduit means comprises a branch conduit means branching from a portion of said refrigerant conduit means running from said condenser means to said pressure reducing means, and said flow regulating means comprises a capacity control valve means arranged in said branch conduit means for controlling the pressure prevailing in said crank chamber of said non-clutch type variable capacity refrigerant compressor in response to a change in the suction pressure of the gas-phase refrigerant sucked into said compressor.

13. A refrigerating system according to claim 12, wherein said capacity control valve means arranged in said branch conduit means is arranged so as to be operated in response to a pressure of the refrigerant measured at an outlet of said evaporator means.

14. A refrigerating system according to claim 12, wherein said flow regulating means comprises a selector valve arranged in a portion of said refrigerant conduit means at a position between a branching point of said branch conduit means and said pressure reducing means, said selector valve selectively regulating the flow of the refrigerant flowing in said portion of said refrigerant conduit means.

15. A refrigerating system according to claim 14, wherein said selector valve comprises a solenoid-operated valve operated in response to electric ON and OFF signals.

16. A refrigerating system according to claim 12, wherein said pressure reducing means comprises an electronic expansion valve means arranged in said refrigerant conduit for regulating a flow of the liquid-phase refrigerant flowing therethrough in response to a signal indicating the temperature of the refrigerant at a predetermined position in the refrigerant conduit means.

17. A refrigerating system according to claim 1, wherein said refrigerating system employs a clutch-mounted type refrigerant compressor driven by said drive source via a solenoid-operated clutch as said variable capacity type refrigerant compressor, and wherein said refrigerant supply conduit means comprises a refrigerant branch conduit branching from a portion of said refrigerant conduit means running from said condenser means to said pressure reducing means, said refrigerant branch conduit extending to said crank chamber of said clutch-mounted type variable capacity refrigerant compressor.

18. A refrigerating system according to claim 17, wherein said flow regulating means comprises a capacity control valve arranged in said refrigerant branch conduit for constantly controlling the pressure in said crank chamber of said compressor, in response to a change in a pressure of the refrigerant sucked into said compressor.

19. A refrigerating system according to claim 17, wherein said capacity control valve arranged in said refrigerant branch conduit is arranged so as to be operated in response to a change in the pressure of the refrigerant measured at an outlet of said evaporator means.

20. A refrigerating system according to claim 3, wherein said refrigerant supply conduit means comprises a refrigerant branch conduit branching from a portion of said refrigerant conduit means running from said pressure reducing means to said evaporator means, and extending to said crank chamber of said non-clutch type variable capacity type refrigerant compressor, said refrigerant branch conduit being provided with a choke formed in a part thereof, and wherein said flow regulating means comprises a selector valve means arranged in said refrigerant conduit means at a position between a branching point of said refrigerant branch conduit and said evaporator means, said selector valve means operating so as to selectively regulate a flow of the liquid-phase refrigerant flowing in said refrigerant conduit means toward said evaporator means.

21. A refrigerating system according to claim 20, wherein said non-clutch type compressor comprises a refrigerant supply passageway extending from said discharge chamber to said crank chamber, and a capacity control valve means arranged in said refrigerant supply passageway for controlling the pressure prevailing in said crank chamber.

22. A refrigerating system according to claim 21, wherein said capacity control valve means is disposed so as to adjustably change the flow of the refrigerant at a high pressure in said refrigerant supply passageway, in response to the pressure of the gas-phase refrigerant sucked into said compressor.

23. A refrigerating system according to claim 21, wherein said capacity control valve means is disposed so as to adjustably change the flow of the refrigerant, at a high pressure, in said refrigerant supply passageway, in response to the pressure in said refrigerant supply conduit means.

24. A refrigerating system according to claim 20, wherein said choke formed in a part of said refrigerant branching conduit of said refrigerant supply conduit means has a cross-sectional area smaller than said choke formed in said gas extraction passageway means.

25. A refrigerating system according to claim 20, wherein said selector valve means of said flow regulating means comprises a solenoid-operated valve operated in response to electric ON and OFF signals.

* * * * *